(12) United States Patent
Hsu et al.

(10) Patent No.: US 10,649,179 B2
(45) Date of Patent: May 12, 2020

(54) PHOTOGRAPHING LENS ASSEMBLY, IMAGE CAPTURING UNIT AND ELECTRONIC DEVICE

(71) Applicant: LARGAN Precision Co., Ltd., Taichung (TW)

(72) Inventors: Po-Lun Hsu, Taichung (TW); Wei-Yu Chen, Taichung (TW); Kuan-Ting Yeh, Taichung (TW); Ssu-Hsin Liu, Taichung (TW)

(73) Assignee: LARGAN Precision Co., Ltd., Taichung (TW)

( * ) Notice: Subject to any disclaimer, the term of this patent is extended or adjusted under 35 U.S.C. 154(b) by 125 days.

(21) Appl. No.: 15/796,276

(22) Filed: Oct. 27, 2017

(65) Prior Publication Data
US 2018/0299649 A1 Oct. 18, 2018

(30) Foreign Application Priority Data
Apr. 14, 2017 (TW) .............................. 106112689 A

(51) Int. Cl.
*G02B 9/62* (2006.01)
*G02B 13/00* (2006.01)

(52) U.S. Cl.
CPC .......... *G02B 13/0045* (2013.01); *G02B 9/62* (2013.01)

(58) Field of Classification Search
CPC .... G02B 9/62; G02B 13/0045; G02B 13/002; G02B 13/18; G02B 27/0025

USPC .................................................. 359/642–830
See application file for complete search history.

(56) References Cited

U.S. PATENT DOCUMENTS

| | | | |
|---|---|---|---|
| 9,103,962 B2 | 8/2015 | Liao et al. | |
| 9,606,327 B2 | 3/2017 | Lin et al. | |
| 2018/0011294 A1* | 1/2018 | Lai | G02B 5/005 |

FOREIGN PATENT DOCUMENTS

| | | |
|---|---|---|
| CN | 106547070 A | 3/2017 |
| TW | M527550 U | 8/2016 |

* cited by examiner

*Primary Examiner* — Mahidere S Sahle
(74) *Attorney, Agent, or Firm* — Hanley, Flight & Zimmerman, LLC

(57) ABSTRACT

A photographing lens assembly includes, in order from an object side to an image side: a first, a second, a third, a fourth, a fifth and a sixth lens elements. The first lens element with negative refractive power has an object-side surface being concave in a paraxial region thereof, wherein the object-side surface has at least one convex critical point in an off-axis region thereof. The third lens element has an image-side surface being convex in a paraxial region thereof. The fourth lens element has positive refractive power. The fifth lens element with negative refractive power has an object-side surface being concave in a paraxial region thereof, and an image-side surface being convex in a paraxial region thereof. The sixth lens element has an image-side surface being concave in a paraxial region thereof, wherein the image-side surface has at least one convex critical point in an off-axis region thereof.

20 Claims, 26 Drawing Sheets

PHOTOGRAPHING LENS ASSEMBLY, IMAGE CAPTURING UNIT AND ELECTRONIC DEVICE

RELATED APPLICATIONS

This application claims priority under 35 U.S.C. § 119 to Taiwan Application 106112689, filed Apr. 14, 2017, which is incorporated by reference herein in its entirety.

BACKGROUND

Technical Field

The present disclosure relates to a photographing lens assembly, an image capturing unit and an electronic device, more particularly to a photographing lens assembly and an image capturing unit applicable to an electronic device.

Description of Related Art

In recent years, with the popularity of electronic devices having camera functionalities, the demand for miniaturized optical systems has been increasing. As advanced semiconductor manufacturing technologies have reduced the pixel size of image sensors, and compact optical systems have gradually evolved toward the field of higher megapixels, there is an increasing demand for compact optical systems featuring better image quality.

With the development of the miniaturized optical systems, electronic devices equipped with the optical systems, such as smartphones, driving recorders, image recognition systems, video game consoles and smart home devices, are the trend of future technologies. Also, in order to obtain user experiences in a broader range of applications, smart electronic devices equipped with one, two, even three lenses, which have different fields of view, have become the mainstream on the market. Accordingly, imaging lenses with different features are provided for various applications; in addition, the need for optical systems with large angle of view is now higher than ever, and the product specifications are becoming more demanding as well.

However, a first lens element (i.e., the lens element closest to the imaged object) in a conventional lens assembly with a wide view angle configuration usually has negative refractive power, an object-side surface being convex in a paraxial region thereof and an image-side surface being concave in a paraxial region thereof. Therefore, it is favorable for light from large angle of view projecting onto an image surface. However, a shape design of the first lens element usually has a big influence on the dimension and size of a photographing module. For example, the center part of the first lens element may protrude out of the photographing module, and thus the photographing module is inapplicable to a compact portable electronic device. Accordingly, there is a need for a photographing lens assembly having a first lens element with a proper shape on the object-side surface thereof for meeting the requirements of compact size and a wide view angle.

SUMMARY

According to one aspect of the present disclosure, a photographing lens assembly includes six lens elements. The six lens elements are, in order from an object side to an image side, a first lens element, a second lens element, a third lens element, a fourth lens element, a fifth lens element and a sixth lens element. The first lens element with negative refractive power has an object-side surface being concave in a paraxial region thereof, wherein the object-side surface of the first lens element has at least one convex critical point in an off-axis region thereof. The third lens element has an image-side surface being convex in a paraxial region thereof. The fourth lens element has positive refractive power. The fifth lens element with negative refractive power has an object-side surface being concave in a paraxial region thereof and an image-side surface being convex in a paraxial region thereof. The sixth lens element has an image-side surface being concave in a paraxial region thereof, wherein the image-side surface of the sixth lens element has at least one convex critical point in an off-axis region thereof, and an object-side surface and the image-side surface of the sixth lens element are both aspheric. When a curvature radius of the object-side surface of the first lens element is R1, a curvature radius of an image-side surface of the first lens element is R2, a central thickness of the sixth lens element is CT6, and an axial distance between the fifth lens element and the sixth lens element is T56, the following conditions are satisfied:

$|R1/R2|<5.0$; and $1.60<CT6/T56<100$.

According to another aspect of the present disclosure, a photographing lens assembly includes six lens elements. The six lens elements are, in order from an object side to an image side, a first lens element, a second lens element, a third lens element, a fourth lens element, a fifth lens element and a sixth lens element. The first lens element with negative refractive power has an object-side surface being concave in a paraxial region thereof, wherein the object-side surface of the first lens element has at least one convex critical point in an off-axis region thereof. The third lens element has an image-side surface being convex in a paraxial region thereof. The fourth lens element has positive refractive power. The fifth lens element with negative refractive power has an object-side surface being concave in a paraxial region thereof and an image-side surface being convex in a paraxial region thereof. The sixth lens element has an image-side surface being concave in a paraxial region thereof, wherein the image-side surface of the sixth lens element has at least one convex critical point in an off-axis region thereof, and an object-side surface and the image-side surface of the sixth lens element are both aspheric. When a curvature radius of the object-side surface of the first lens element is R1, a curvature radius of an image-side surface of the first lens element is R2, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and an axial distance between the fifth lens element and the sixth lens element is T56, the following conditions are satisfied:

$|R1/R2| \leq 3.0$; and $0<(T12+T56)/(T23+T34+T45)<3.0$.

According to still another aspect of the present disclosure, an image capturing unit includes one of the aforementioned photographing lens assemblies and an image sensor, wherein the image sensor is disposed on an image surface of the photographing lens assembly.

According to yet another aspect of the present disclosure, an electronic device includes the aforementioned image capturing unit.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
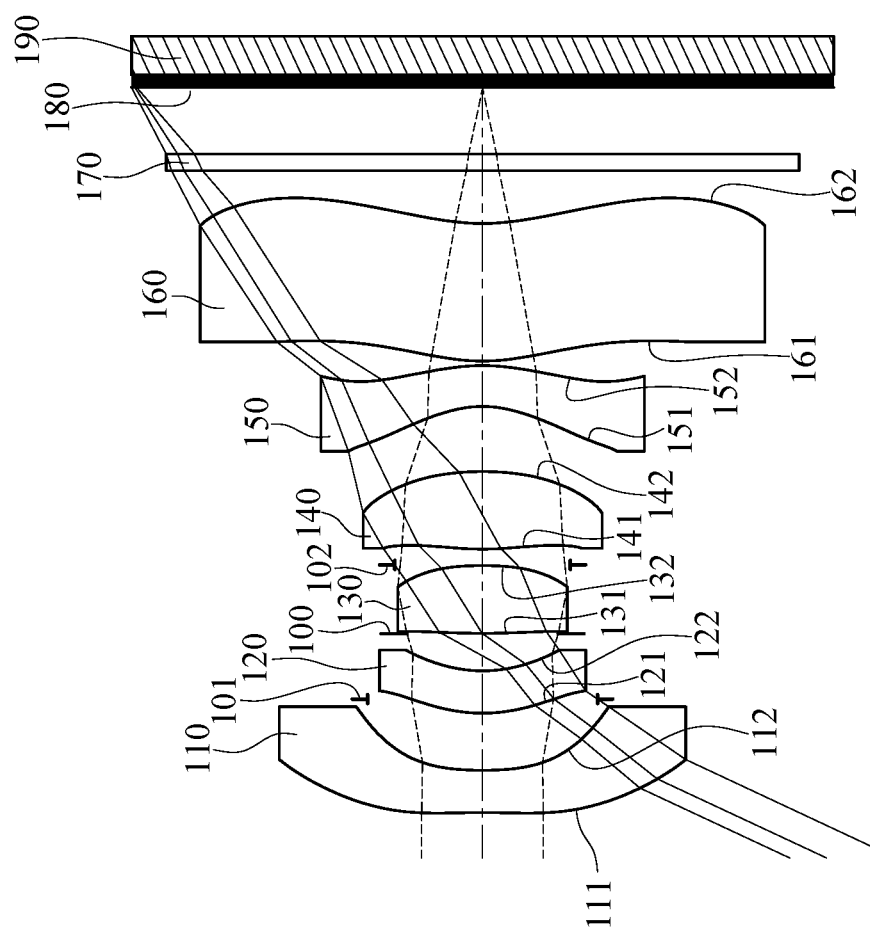
FIG. 1 is a schematic view of an image capturing unit according to the 1st embodiment of the present disclosure.

A photographing lens assembly includes, in order from an object side to an image side, a first lens element, a second lens element, a third lens element, a fourth lens element, a fifth lens element and a sixth lens element.

The first lens element has negative refractive power; therefore, it is favorable for providing the photographing lens assembly with a wide view angle configuration. The first lens element has an object-side surface being concave in a paraxial region thereof; therefore, it is favorable for properly adjusting a shape of the object-side surface of the first lens element in a paraxial region thereof. The object-side surface of the first lens element has at least one convex critical point in an off-axis region thereof; therefore, it is favorable for the photographing lens assembly to gather light from the off-axis region.

The second lens element can have positive refractive power; therefore, it is favorable for having sufficient positive refractive power so as to reduce the total track length of the photographing lens assembly. The second lens element can have an object-side surface being convex in a paraxial region thereof; therefore, it is favorable for the second lens element to have sufficient positive refractive power. The second lens element can have an image-side surface being concave in a paraxial region thereof; therefore, it is favorable for correcting aberrations generated by the first lens element.

The third lens element has an image-side surface being convex in a paraxial region thereof. Therefore, it is favorable for correcting aberrations and reducing sensitivity so as to further improve the image quality.

The fourth lens element has positive refractive power. Therefore, it is favorable for increasing the light convergence capability and reducing the total track length of the photographing lens assembly so as to meet the requirement of compactness.

The fifth lens element has negative refractive power; therefore, it is favorable for balancing the positive refractive power of the fourth lens element and correcting chromatic aberration. The fifth lens element has an object-side surface being concave in a paraxial region thereof and an image-side surface being convex in a paraxial region thereof; therefore, it is favorable for enhancing the symmetry of the photographing lens assembly so as to further reducing sensitivity, thereby improving the image quality.

The sixth lens element can have positive refractive power; therefore, along with the fifth lens element having strong negative refractive power, it is favorable for correcting off-axis aberrations and providing the sixth lens element with a shape favorable for manufacturing (e.g., lens element having large thickness and smooth shape). The sixth lens element can have an object-side surface being convex in a paraxial region thereof; therefore, it is favorable for reducing the total track length of the photographing lens assembly. The sixth lens element has an image-side surface being concave in a paraxial region thereof, and the image-side surface of the sixth lens element has at least one convex critical point in an off-axis region thereof; therefore, it is favorable for correcting the Petzval sum of the photographing lens assembly so as to flatten the image surface and correct off-axis aberrations.

According to the present disclosure, among the second through the fifth lens elements, each of at least two lens elements can have at least one critical point in an off-axis region thereof. In detail, when a lens element has at least one critical point in an off-axis region thereof, either the object-side surface of the lens element, the image-side surface of the lens element or both have at least one critical point in an off-axis region thereof. Therefore, it is favorable for light at the off-axis region traveling into the photographing lens assembly.

When a curvature radius of the object-side surface of the first lens element is R1, and a curvature radius of an image-side surface of the first lens element is R2, the following condition is satisfied: |R1/R2|<5.0. Therefore, it is favorable for adjusting the shape of the object-side surface of the first lens element, and for light at the off-axis region traveling into the photographing lens assembly when the object-side surface of the first lens element is concave. Preferably, the following condition can also be satisfied: |R1/R2|3.0.

When a central thickness of the sixth lens element is CT6, and an axial distance between the fifth lens element and the sixth lens element is T56, the following condition can be satisfied: 1.60<CT6/T56<100. Therefore, it is favorable for obtaining a better optical and mechanical configuration of the fifth lens element and sixth lens element by reducing the axial distance between these two lens elements while efficiently utilizing the space in the photographing lens assembly and achieving compactness. Preferably, the following condition can also be satisfied: 2.0<CT6/T56<100.

When a maximum field of view of the photographing lens assembly is FOV, the following condition can be satisfied: 100 [deg.]<FOV<200 [deg.]. Therefore, it is favorable for a wide view angle configuration.

When an f-number of the photographing lens assembly is FNo, the following condition can be satisfied: 1.25<FNo<3.0. Therefore, it is favorable for enlarging the aperture stop so as to capture enough image information in low light condition (for example, in the night) or dynamic photography (for example, short exposure photography); also, it is favorable for increasing imaging speed so as to achieve high image quality in a well-lit condition.

When a focal length of the fourth lens element is f4, and a focal length of the fifth lens element is f5, the following condition can be satisfied: |f5/f4|<1.50. Therefore, it is favorable for the fifth lens element to have sufficient negative refractive power so as to correct aberrations generated by the fourth lens element having strong positive refractive power.

When an axial distance between the first lens element and the second lens element is T12, and an axial distance between the second lens element and the third lens element is T23, the following condition can be satisfied: T12/T23<1.60. Therefore, it is favorable for preventing the axial distance between the first lens element and the second lens element from being overly large so as to prevent assembling problems; furthermore, it is favorable for preventing the peripheral shape of the first lens element from being overly curved so as to prevent surface reflection and molding problems.

When a focal length of the first lens element is f1, and a focal length of the sixth lens element is f6, the following condition can be satisfied: |f1/f6|<1.0. Therefore, it is favorable for preventing overcorrecting off-axis aberrations due to the refractive power of the sixth lens element being overly strong; furthermore, it is favorable for light at the off-axis region traveling into the photographing lens assembly by preventing the refractive power of the first lens element from being overly weak.

Figure 25:
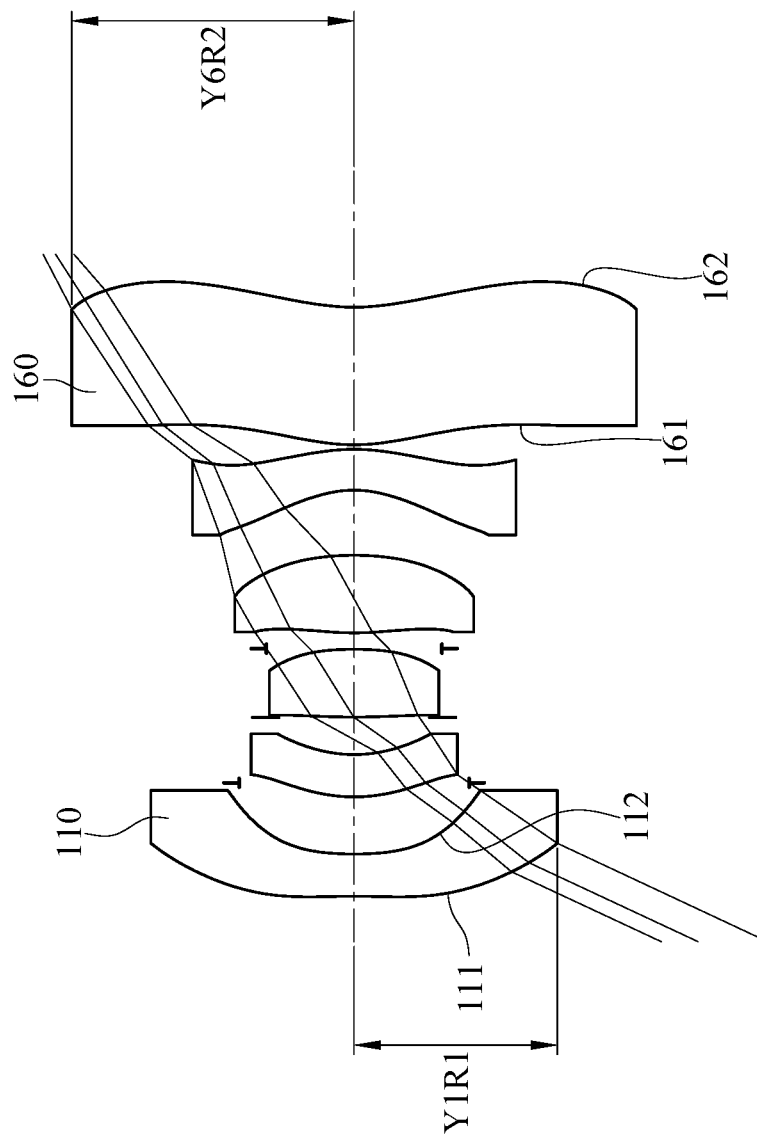
FIG. 25 shows a schematic view of Y1R1 and Y6R2 according to the 1st embodiment of the present disclosure.

When a maximum effective radius of the object-side surface of the first lens element is Y1R1, and a maximum effective radius of the image-side surface of the sixth lens element is Y6R2, the following condition can be satisfied: 0.60<Y1R1/Y6R2<1.0. Therefore, it is favorable for preventing the object side of the photographing lens assembly from being overly large, and the image side of the photographing lens assembly from being overly small, thereby increasing assembling yield rate; thus, it is favorable for the photographing lens assembly to be disposed in compact electronic devices. Please refer to FIG. 25, which shows a schematic view of Y1R1 and Y6R2 according to the 1st embodiment of the present disclosure.

When a curvature radius of an object-side surface of the third lens element is R5, and a curvature radius of the image-side surface of the third lens element is R6, the following condition can be satisfied: 0.25<(R5+R6)/(R5−R6)<1.50. Therefore, a shape of the third lens element is favorable configured with the first and the second lens elements and for light converging onto the image surface.

When a focal length of the photographing lens assembly is f, a curvature radius of the object-side surface of the second lens element is R3, and a curvature radius of the image-side surface of the second lens element is R4, the following condition can be satisfied: 1.5<(f/R3)+(f/R4)<5.0. Therefore, a shape of the second lens element is favorable configured with the first lens element so as to prevent surface reflection at the off-axis region, and ensure light at the off-axis region is able to converge at the image surface.

When the axial distance between the first lens element and the second lens element is T12, the axial distance between the second lens element and the third lens element is T23, an axial distance between the third lens element and the fourth lens element is T34, an axial distance between the fourth lens element and the fifth lens element is T45, and the axial distance between the fifth lens element and the sixth lens element is T56, the following condition can be satisfied: 0<(T12+T56)/(T23+T34+T45)<3.0. Therefore, it is favorable for keeping the photographing lens assembly compact, and also favorable for preventing the axial distance between the first lens element and the second lens element from being overly large so as to prevent assembling problems; moreover, it is favorable for preventing the shape of the first lens element from being overly curved so as to reduce surface reflection and molding problems. Furthermore, it is favorable for evenly arranging the distances between lens elements of the photographing lens assembly. Preferably, the following condition can also be satisfied: 0.35<(T12+T56)/(T23+T34+T45)<1.75.

When the focal length of the photographing lens assembly is f, and the central thickness of the sixth lens element is CT6, the following condition can be satisfied: f/CT6<3.60. Therefore, it is favorable for providing the sixth lens element with a shape being favorable for manufacturing (e.g., lens element having large thickness and smooth shape).

Figure 26:
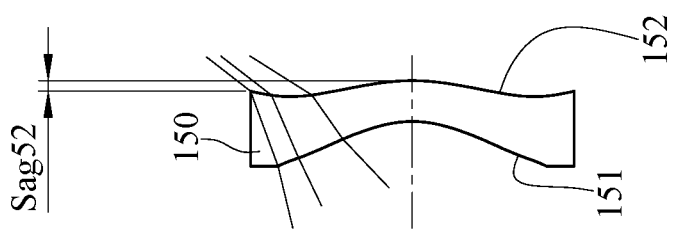
FIG. 26 shows a schematic view of Sag52 according to the 1st embodiment of the present disclosure.

When a displacement in parallel with an optical axis from an axial vertex of the image-side surface of the fifth lens element to a maximum effective radius position of the image-side surface of the fifth lens element is Sag52, and a central thickness of the fifth lens element is CT5, the following condition can be satisfied: −0.75<Sag52/CT5<0.25. Therefore, the shape configuration in the off-axis region of the fifth lens element and sixth lens element is well integrated, such that the shape of the fifth lens element is favorable for manufacturing. Please refer to FIG. 26, which shows a schematic view of Sag52 according to the 1st embodiment of the present disclosure.

According to the present disclosure, the photographing lens assembly further includes an aperture stop which can be located between the second lens element and the third lens element. Therefore, the location of the aperture stop is favorable for obtaining a balance between large field of view and compactness.

When an axial distance between the object-side surface of the first lens element and an image surface is TL, and the curvature radius of the object-side surface of the first lens element is R1, the following condition can be satisfied: −5.0<TL/R1<−0.50. Therefore, it is favorable for further enhancing the feature of the object-side surface of the first lens element and allowing light at the off-axis region traveling into the photographing lens assembly with the object-side surface of the first lens element being concave. Furthermore, it is favorable for reducing the total track length so as to keep the photographing lens assembly compact.

When the focal length of the photographing lens assembly is f, a focal length of the second lens element is f2, the focal length of the sixth lens element is f6, and a focal length of the i-th lens element is fi, the following condition can be satisfied: |f/f2|+|f/f6|<|f/fi|, wherein i=1, 3, 4, 5. Therefore, it is favorable for preventing the refractive power of any single lens element from being overly strong so as to correct aberrations properly.

According to the present disclosure, the lens elements thereof can be made of glass or plastic material. When the lens elements are made of glass material, the distribution of the refractive power of the lens system may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the lens system can also be reduced.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, a critical point is a non-axial point of the lens surface where its tangent is perpendicular to the optical axis.

According to the present disclosure, an image surface of the photographing lens assembly, based on the corresponding image sensor, can be flat or curved, especially a curved surface being concave facing towards the object side of the photographing lens assembly. Furthermore, an image correction unit, such as a field flattener, can be optionally disposed between the lens elements of the photographing lens assembly and the image surface for correction of aberrations such as field curvature. The optical properties of the image correction unit, such as curvature, thickness, index of refraction, position and surface shape (convex or concave surface with spherical, aspheric, diffraction or Fresnel types), can be adjusted according to the demand of an image capturing unit. In general, a preferable image correction unit is, for example, a thin transparent element having a concave object-side surface and a planar image-side surface, and the thin transparent element is disposed near the image surface.

According to the present disclosure, the photographing lens assembly can include at least one stop, such as an aperture stop, a glare stop or a field stop. Said glare stop or said field stop is set for eliminating the stray light and thereby improving the image quality thereof.

According to the present disclosure, an aperture stop can be configured as a front stop or a middle stop. A front stop disposed between an imaged object and the first lens element can provide a longer distance between an exit pupil of the lens system and the image surface to produce a telecentric effect, and thereby improves the image-sensing efficiency of an image sensor (for example, CCD or CMOS). A middle stop disposed between the first lens element and the image surface is favorable for enlarging the view angle of the photographing lens assembly and thereby provides a wider field of view for the same.

According to the above description of the present disclosure, the following specific embodiments are provided for further explanation.

1st Embodiment

Figure 2:
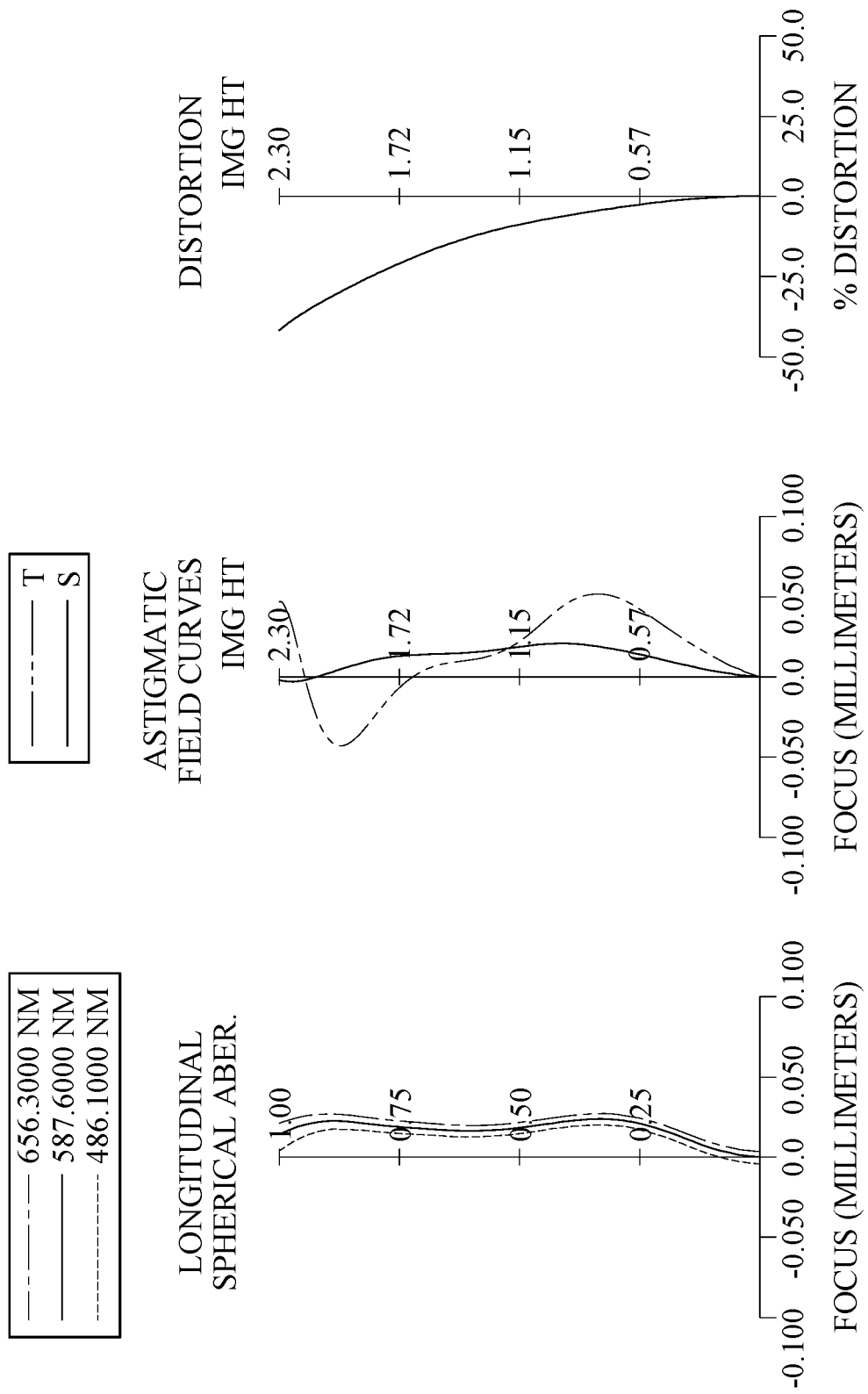
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the photographing lens assembly (its reference numeral is omitted) of the present disclosure and an image sensor 190. The photographing lens assembly includes, in order from an object side to an image side, a first lens element 110, a first stop 101, a second lens element 120, an aperture stop 100, a third lens element 130, a second stop 102, a fourth lens element 140, a fifth lens element 150, a sixth lens element 160, an IR-cut filter 170 and an image surface 180. The photographing lens assembly includes six lens elements (110, 120, 130, 140, 150 and 160) with no additional lens element disposed between the first lens element 110 and the sixth lens element 160.

The first lens element 110 with negative refractive power has an object-side surface 111 being concave in a paraxial region thereof and an image-side surface 112 being concave in a paraxial region thereof. The first lens element 110 is made of plastic material and has the object-side surface 111 and the image-side surface 112 being both aspheric. The object-side surface 111 of the first lens element 110 has at least one convex critical point in an off-axis region thereof.

The second lens element 120 with negative refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with positive refractive power has an object-side surface 131 being convex in a paraxial region thereof and an image-side surface 132 being convex in a paraxial region thereof. The third lens element 130 is made of plastic material and has the object-side surface 131 and the image-side surface 132 being both aspheric. The object-side surface 131 of the third lens element 130 has at least one concave critical point in an off-axis region thereof.

The fourth lens element 140 with positive refractive power has an object-side surface 141 being convex in a paraxial region thereof and an image-side surface 142 being convex in a paraxial region thereof. The fourth lens element 140 is made of plastic material and has the object-side surface 141 and the image-side surface 142 being both aspheric. The object-side surface 141 of the fourth lens element 140 has at least one concave critical point in an off-axis region thereof.

The fifth lens element 150 with negative refractive power has an object-side surface 151 being concave in a paraxial region thereof and an image-side surface 152 being convex in a paraxial region thereof. The fifth lens element 150 is made of plastic material and has the object-side surface 151 and the image-side surface 152 being both aspheric. The image-side surface 152 of the fifth lens element 150 has at least one concave critical point in an off-axis region thereof.

The sixth lens element 160 with positive refractive power has an object-side surface 161 being convex in a paraxial region thereof and an image-side surface 162 being concave in a paraxial region thereof. The sixth lens element 160 is made of plastic material and has the object-side surface 161 and the image-side surface 162 being both aspheric. The object-side surface 161 of the sixth lens element 160 has at least one concave critical point in an off-axis region thereof. The image-side surface 162 of the sixth lens element 160 has at least one convex critical point in an off-axis region thereof.

The IR-cut filter 170 is made of glass material and located between the sixth lens element 160 and the image surface 180, and will not affect the focal length of the photographing lens assembly. The image sensor 190 is disposed on or near the image surface 180 of the photographing lens assembly.

The equation of the aspheric surface profiles of the aforementioned lens elements of the 1st embodiment is expressed as follows:

$$X(Y) = (Y^2/R)/(1 + \text{sqrt}(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the photographing lens assembly of the image capturing unit according to the 1st embodiment, when a focal length of the photographing lens assembly is f, an f-number of the photographing lens assembly is FNo, and half of a maximum field of view of the photographing lens assembly is HFOV, these parameters have the following values: f=1.91 millimeters (mm), FNo=2.38, HFOV=64.9 degrees (deg.).

When the maximum field of view of the photographing lens assembly is FOV, the following condition is satisfied: FOV=129.8 degrees.

When an axial distance between the first lens element 110 and the second lens element 120 is T12, and an axial distance between the second lens element 120 and the third lens element 130 is T23, the following condition is satisfied: T12/T23=1.52. In this embodiment, the axial distance between two adjacent lens elements is the air gap in a paraxial region between the two adjacent lens elements.

When the axial distance between the first lens element 110 and the second lens element 120 is T12, the axial distance between the second lens element 120 and the third lens element 130 is T23, an axial distance between the third lens element 130 and the fourth lens element 140 is T34, an axial distance between the fourth lens element 140 and the fifth lens element 150 is T45, and an axial distance between the fifth lens element 150 and the sixth lens element 160 is T56, the following condition is satisfied: (T12+T56)/(T23+T34+T45)=0.52.

When a central thickness of the sixth lens element 160 is CT6, and the axial distance between the fifth lens element 150 and the sixth lens element 160 is T56, the following condition is satisfied: CT6/T56=30.33.

When an axial distance between the object-side surface 111 of the first lens element 110 and the image surface 180 is TL, and a curvature radius of the object-side surface 111 of the first lens element 110 is R1, the following condition is satisfied: TL/R1=−0.72.

When a displacement in parallel with an optical axis from an axial vertex of the image-side surface 152 of the fifth lens element 150 to a maximum effective radius position of the image-side surface 152 of the fifth lens element 150 is Sag52, and a central thickness of the fifth lens element 150 is CT5, the following condition is satisfied: Sag52/CT5=−0.26.

When a maximum effective radius of the object-side surface 111 of the first lens element 110 is Y1R1, and a maximum effective radius of the image-side surface 162 of the sixth lens element 160 is Y6R2, the following condition is satisfied: Y1R1/Y6R2=0.72.

When a curvature radius of the object-side surface 131 of the third lens element 130 is R5, and a curvature radius of the image-side surface 132 of the third lens element 130 is R6, the following condition is satisfied: (R5+R6)/(R5-R6)=0.36.

When the curvature radius of the object-side surface 111 of the first lens element 110 is R1, and a curvature radius of the image-side surface 112 of the first lens element 110 is R2, the following condition is satisfied: |R1/R2|=3.00.

When a focal length of the first lens element 110 is f1, and a focal length of the sixth lens element 160 is f6, the following condition is satisfied: |f1/f6|=0.40.

When a focal length of the fourth lens element 140 is f4, and a focal length of the fifth lens element 150 is f5, the following condition is satisfied: |f5/f4|=1.48.

When the focal length of the photographing lens assembly is f, a focal length of the second lens element 120 is f2, and the focal length of the sixth lens element 160 is f6, the following condition is satisfied: |f/f2|+|f/f6|=0.33.

When the focal length of the photographing lens assembly is f, and the focal length of the first lens element 110 is f1, the following condition is satisfied: |f/f1|=0.63.

When the focal length of the photographing lens assembly is f, and the focal length of the third lens element 130 is f3, the following condition is satisfied: |f/f3|=0.63.

When the focal length of the photographing lens assembly is f, and the focal length of the fourth lens element 140 is f4, the following condition is satisfied: |f/f4|=1.06.

When the focal length of the photographing lens assembly is f, and the focal length of the fifth lens element 150 is f5, the following condition is satisfied: |f/f5|=0.71.

When the focal length of the photographing lens assembly is f, and the central thickness of the sixth lens element 160 is CT6, the following condition is satisfied: f/CT6=2.10.

When the focal length of the photographing lens assembly is f, a curvature radius of the object-side surface 121 of the second lens element 120 is R3, and a curvature radius of the image-side surface 122 of the second lens element 120 is R4, the following condition is satisfied: (f/R3)+(f/R4)=3.88.

The detailed optical data of the 1st embodiment are shown in Table 1 and the aspheric surface data are shown in Table 2 below.

TABLE 1

1st Embodiment
f = 1.91 mm, FNo = 2.38, HFOV = 64.9 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Lens 1 | −6.623 | (ASP) | 0.280 | Plastic | 1.545 | 56.0 | −3.01 |
| 2 |  | 2.208 | (ASP) | 0.471 |  |  |  |  |
| 3 | 1st Stop | Plano |  | −0.093 |  |  |  |  |
| 4 | Lens 2 | 1.074 | (ASP) | 0.280 | Plastic | 1.634 | 23.8 | −26.29 |
| 5 |  | 0.907 | (ASP) | 0.246 |  |  |  |  |
| 6 | Ape. Stop | Plano |  | 0.002 |  |  |  |  |
| 7 | Lens 3 | 4.978 | (ASP) | 0.448 | Plastic | 1.544 | 56.0 | 3.01 |
| 8 |  | −2.361 | (ASP) | 0.005 |  |  |  |  |
| 9 | 2nd Stop | Plano |  | 0.104 |  |  |  |  |
| 10 | Lens 4 | 1.888 | (ASP) | 0.513 | Plastic | 1.544 | 56.0 | 1.81 |
| 11 |  | −1.858 | (ASP) | 0.431 |  |  |  |  |
| 12 | Lens 5 | −0.688 | (ASP) | 0.270 | Plastic | 1.669 | 19.5 | −2.68 |
| 13 |  | −1.292 | (ASP) | 0.030 |  |  |  |  |
| 14 | Lens 6 | 1.293 | (ASP) | 0.910 | Plastic | 1.544 | 56.0 | 7.45 |
| 15 |  | 1.428 | (ASP) | 0.350 |  |  |  |  |
| 16 | IR-cut filter | Plano |  | 0.110 | Glass | 1.517 | 64.2 | — |
| 17 |  | Plano |  | 0.440 |  |  |  |  |
| 18 | Image | Plano |  | — |  |  |  |  |

Note:
Reference wavelength is 587.6 nm (d-line).
An effective radius of the first stop 101 (Surface 3) is 0.760 mm.
An effective radius of the second stop 102 (Surface 9) is 0.580 mm.

TABLE 2

Aspheric Coefficients

| Surface # | 1 | 2 | 4 | 5 | 7 | 8 |
|---|---|---|---|---|---|---|
| k = | −9.0000E+01 | −4.8546E+01 | −2.9821E−01 | −2.2154E+00 | −1.0000E+00 | −7.0937E+00 |
| A4 = | 4.6522E−01 | 1.1387E+00 | −2.4394E−01 | 5.8340E−02 | −1.8625E−01 | −1.2218E+00 |
| A6 = | −5.0741E−01 | −1.1767E+00 | 2.1870E−01 | 2.7610E−01 | 2.9922E−04 | 3.0948E+00 |
| A8 = | 3.8280E−01 | 1.2389E+00 | −2.6810E+00 | −1.6170E+00 | −3.9220E−01 | −9.7931E+00 |
| A10 = | −1.8927E−01 | −7.4276E−01 | 4.8506E+00 | 2.6706E+00 | 1.8190E+00 | 1.9493E+01 |
| A12 = | 5.4102E−02 | 9.9420E−02 | −4.3633E+00 | 9.6354E+00 | −4.5406E+00 | −2.0518E+01 |
| A14 = | −6.4451E−03 | 3.0359E−02 | 1.5230E+00 | — | — | — |

| Surface # | 10 | 11 | 12 | 13 | 14 | 15 |
|---|---|---|---|---|---|---|
| k = | −6.0990E+01 | −2.7973E+01 | −3.8536E+00 | −4.2189E+00 | −1.0946E+01 | −1.3814E+01 |
| A4 = | −6.7874E−02 | −6.5358E−01 | 4.5572E−01 | 5.9751E−01 | −1.3977E−01 | −5.0854E−02 |
| A6 = | −1.8766E+00 | 8.6458E−01 | −3.1121E+00 | −1.7526E+00 | 1.1546E−01 | 3.8660E−02 |
| A8 = | 8.3722E+00 | −1.8613E+00 | 9.1246E+00 | 3.4447E+00 | −1.1734E−01 | −4.0656E−02 |
| A10 = | −2.2107E+01 | 3.2712E+00 | −1.2546E+01 | −3.5792E+00 | 9.1784E−02 | 2.3122E−02 |
| A12 = | 3.7683E+01 | −1.2743E+00 | 8.5309E+00 | 1.9905E+00 | −3.9262E−02 | −7.4847E−03 |
| A14 = | −3.3549E+01 | −2.3014E+00 | −2.4861E+00 | −5.6417E−01 | 8.1662E−03 | 1.3352E−03 |
| A16 = | — | — | — | 6.3808E−02 | −6.8025E−04 | −1.0438E−04 |

In Table 1, the curvature radius, the thickness and the focal length are shown in millimeters (mm). Surface numbers 0-18 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
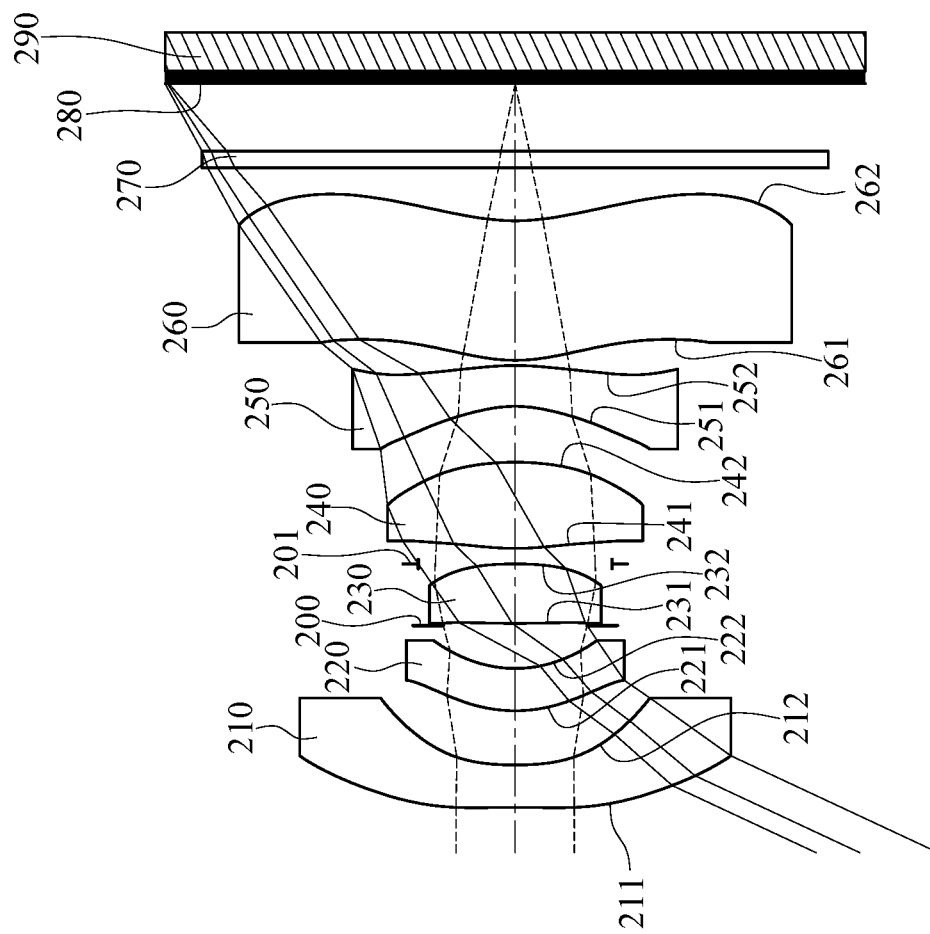
FIG. 3 is a schematic view of an image capturing unit according to the 2nd embodiment of the present disclosure.
Figure 4:
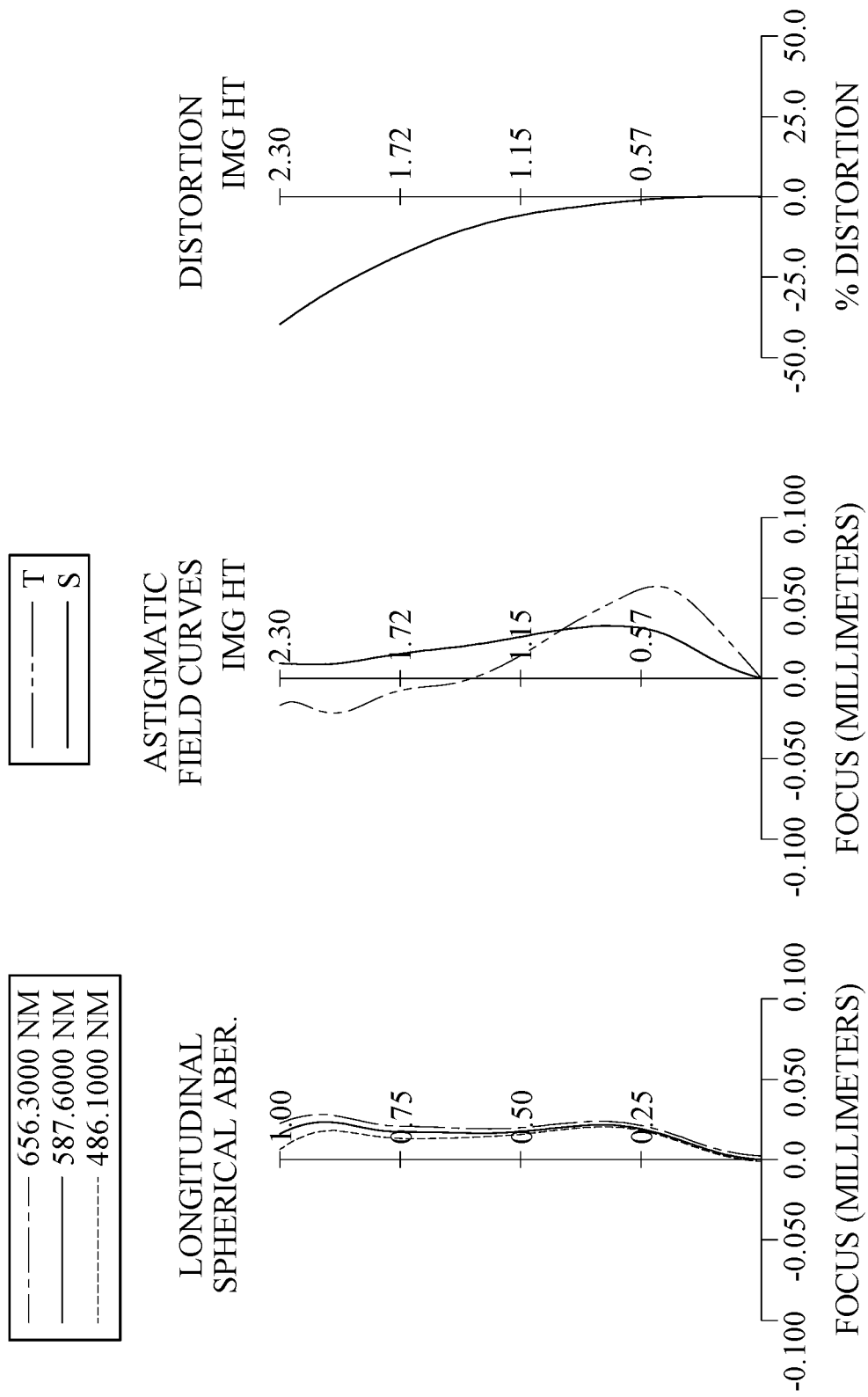
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the photographing lens assembly (its reference numeral is omitted) of the present disclosure and an image sensor 290. The photographing lens assembly includes, in order from an object side to an image side, a first lens element 210, a second lens element 220, an aperture stop 200, a third lens element 230, a stop 201, a fourth lens element 240, a fifth lens element 250, a sixth lens element 260, an IR-cut filter 270 and an image surface 280. The photographing lens assembly includes six lens elements (210, 220, 230, 240, 250 and 260) with no additional lens element disposed between the first lens element 210 and the sixth lens element 260.

The first lens element 210 with negative refractive power has an object-side surface 211 being concave in a paraxial region thereof and an image-side surface 212 being concave in a paraxial region thereof. The first lens element 210 is made of plastic material and has the object-side surface 211 and the image-side surface 212 being both aspheric. The object-side surface 211 of the first lens element 210 has at least one convex critical point in an off-axis region thereof.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of plastic material and has the object-side surface 231 and the image-side surface 232 being both aspheric. The object-side surface 231 of the third lens element 230 has at least one concave critical point in an off-axis region thereof.

The fourth lens element 240 with positive refractive power has an object-side surface 241 being convex in a paraxial region thereof and an image-side surface 242 being convex in a paraxial region thereof. The fourth lens element 240 is made of plastic material and has the object-side surface 241 and the image-side surface 242 being both aspheric. The object-side surface 241 of the fourth lens element 240 has at least one concave critical point in an off-axis region thereof.

The fifth lens element 250 with negative refractive power has an object-side surface 251 being concave in a paraxial region thereof and an image-side surface 252 being convex in a paraxial region thereof. The fifth lens element 250 is made of plastic material and has the object-side surface 251 and the image-side surface 252 being both aspheric. The image-side surface 252 of the fifth lens element 250 has at least one concave critical point in an off-axis region thereof.

The sixth lens element 260 with positive refractive power has an object-side surface 261 being convex in a paraxial region thereof and an image-side surface 262 being concave in a paraxial region thereof. The sixth lens element 260 is made of plastic material and has the object-side surface 261 and the image-side surface 262 being both aspheric. The object-side surface 261 of the sixth lens element 260 has at least one concave critical point in an off-axis region thereof. The image-side surface 262 of the sixth lens element 260 has at least one convex critical point in an off-axis region thereof.

The IR-cut filter 270 is made of glass material and located between the sixth lens element 260 and the image surface 280, and will not affect the focal length of the photographing lens assembly. The image sensor 290 is disposed on or near the image surface 280 of the photographing lens assembly.

The detailed optical data of the 2nd embodiment are shown in Table 3 and the aspheric surface data are shown in Table 4 below.

TABLE 3

2nd Embodiment
f = 1.84 mm, FNo = 2.35, HFOV = 65.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −7.431 | (ASP) | 0.280 | Plastic | 1.515 | 56.5 | −2.97 |
| 2 | | 1.949 | (ASP) | 0.359 | | | | |
| 3 | Lens 2 | 0.959 | (ASP) | 0.280 | Plastic | 1.621 | 24.4 | −32.78 |
| 4 | | 0.813 | (ASP) | 0.284 | | | | |
| 5 | Ape. Stop | Plano | | 0.014 | | | | |
| 6 | Lens 3 | 6.620 | (ASP) | 0.393 | Plastic | 1.544 | 55.9 | 3.62 |
| 7 | | −2.743 | (ASP) | 0.000 | | | | |
| 8 | Stop | Plano | | 0.103 | | | | |
| 9 | Lens 4 | 1.710 | (ASP) | 0.570 | Plastic | 1.544 | 55.9 | 1.71 |
| 10 | | −1.809 | (ASP) | 0.370 | | | | |
| 11 | Lens 5 | −0.794 | (ASP) | 0.270 | Plastic | 1.669 | 19.5 | −2.46 |
| 12 | | −1.748 | (ASP) | 0.034 | | | | |
| 13 | Lens 6 | 1.077 | (ASP) | 0.923 | Plastic | 1.544 | 55.9 | 4.52 |

TABLE 3-continued

2nd Embodiment
f = 1.84 mm, FNo = 2.35, HFOV = 65.0 deg.

| Surface # | | Curvature Radius | | Thickness | Material | Index | Abbe # | Focal Length |
|---|---|---|---|---|---|---|---|---|
| 14 | | 1.338 | (ASP) | 0.350 | | | | |
| 15 | IR-cut filter | Plano | | 0.110 | Glass | 1.517 | 64.2 | — |
| 16 | | Plano | | 0.446 | | | | |
| 17 | Image | Plano | | — | | | | |

Note:
Reference wavelength is 587.6 nm (d-line).
An effective radius of the stop 201 (Surface 8) is 0.640 mm.

TABLE 4

Aspheric Coefficients

| Surface # | 1 | 2 | 3 | 4 | 6 | 7 |
|---|---|---|---|---|---|---|
| k = | −8.5869E+01 | −4.3640E+01 | −7.9062E−02 | −2.0225E+00 | −5.8844E+01 | 5.4188E−01 |
| A4 = | 5.0010E−01 | 1.2346E+00 | −2.3787E−01 | 1.0615E−01 | −1.8429E−01 | −1.2570E+00 |
| A6 = | −6.1502E−01 | −1.4142E+00 | 7.2251E−01 | 2.9420E+00 | −1.0165E+00 | 3.5463E+00 |
| A8 = | 4.5692E−01 | 4.9472E−01 | −6.3433E+00 | −2.3577E+01 | 6.9893E+00 | −1.1745E+01 |
| A10 = | −2.0411E−01 | 6.3417E−01 | 1.5928E+01 | 8.5504E+01 | −2.7112E+01 | 2.4423E+01 |
| A12 = | 5.0257E−02 | −5.8068E−01 | −1.9213E+01 | −1.1307E+02 | 3.3441E+01 | −2.6481E+01 |
| A14 = | −5.0983E−03 | 1.2791E−01 | 8.0434E+00 | — | — | — |

| Surface # | 9 | 10 | 11 | 12 | 13 | 14 |
|---|---|---|---|---|---|---|
| k = | −4.7466E+01 | −5.1817E+01 | −6.2484E+00 | −3.5885E+00 | −9.6820E+00 | −1.2607E+01 |
| A4 = | 1.6031E−02 | −8.8536E−01 | 6.9812E−01 | 8.6301E−01 | −1.4521E−01 | −4.7004E−02 |
| A6 = | −1.7501E+00 | 2.0689E+00 | −4.3916E+00 | −2.6713E+00 | 6.0843E−02 | 3.1913E−02 |
| A8 = | 7.4623E+00 | −6.1164E+00 | 1.0529E+01 | 4.8803E+00 | −4.8670E−02 | −4.2279E−02 |
| A10 = | −1.4495E+01 | 1.2330E+01 | −1.2252E+01 | −4.8708E+00 | 7.0201E−02 | 2.7314E−02 |
| A12 = | 1.5300E+01 | −1.1593E+01 | 7.1449E+00 | 2.6732E+00 | −4.9226E−02 | −9.3555E−03 |
| A14 = | −7.8169E+00 | 3.5561E+00 | −1.8544E+00 | −7.5737E−01 | 1.4829E−02 | 1.6571E−03 |
| A16 = | — | — | — | 8.6168E−02 | −1.6026E−03 | −1.2358E−04 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 1.84 | |R1/R2| | 3.81 |
| FNo | 2.35 | |f1/f6| | 0.66 |
| HFOV [deg.] | 65.0 | |f5/f4| | 1.44 |
| FOV [deg.] | 130.0 | |f/f2| + |f/f6| | 0.46 |
| T12/T23 | 1.20 | |f/f1| | 0.62 |
| (T12 + T56)/(T23 + T34 + T45) | 0.51 | |f/f3| | 0.51 |
| CT6/T56 | 27.15 | |f/f4| | 1.08 |
| TL/R1 | −0.64 | |f/f5| | 0.75 |
| Sag52/CTS | −0.09 | f/CT6 | 1.99 |
| Y1R1/Y6R2 | 0.78 | (f/R3) + (f/R4) | 4.18 |
| (R5 + R6)/(R5 − R6) | 0.41 | — | — |

3rd Embodiment

Figure 5:
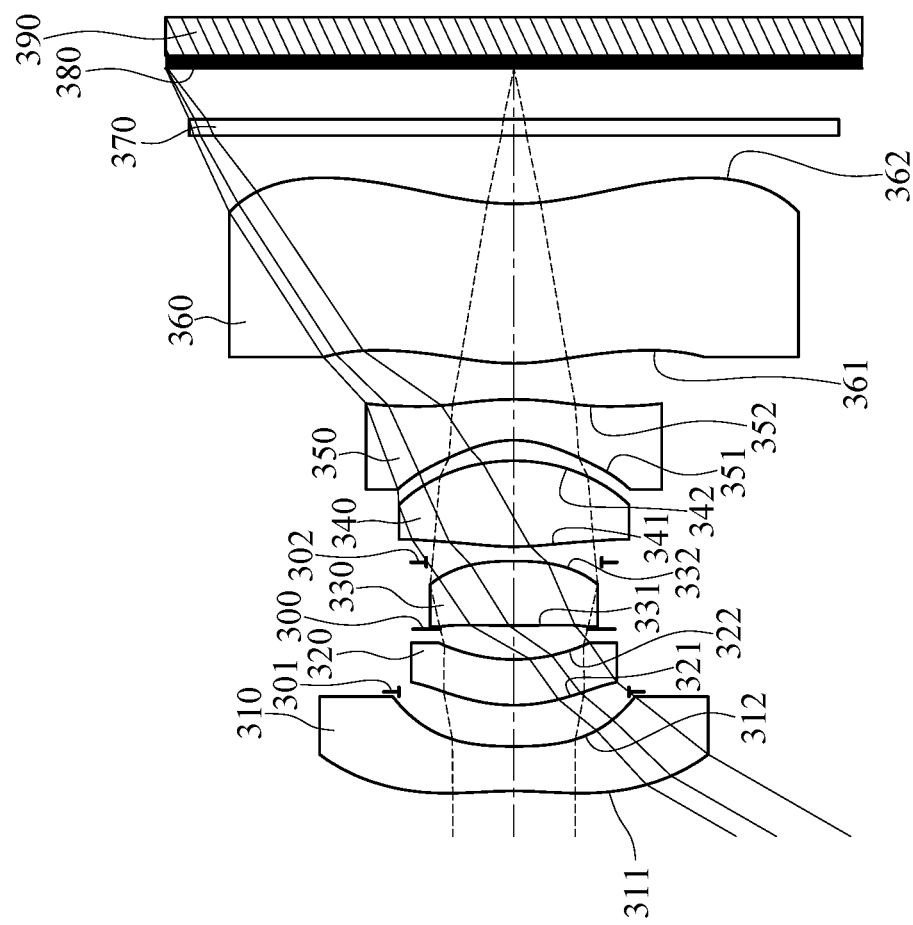
FIG. 5 is a schematic view of an image capturing unit according to the 3rd embodiment of the present disclosure.

FIG. 5 is a schematic view of an image capturing unit according to the 3rd embodiment of the present disclosure.

Figure 6:
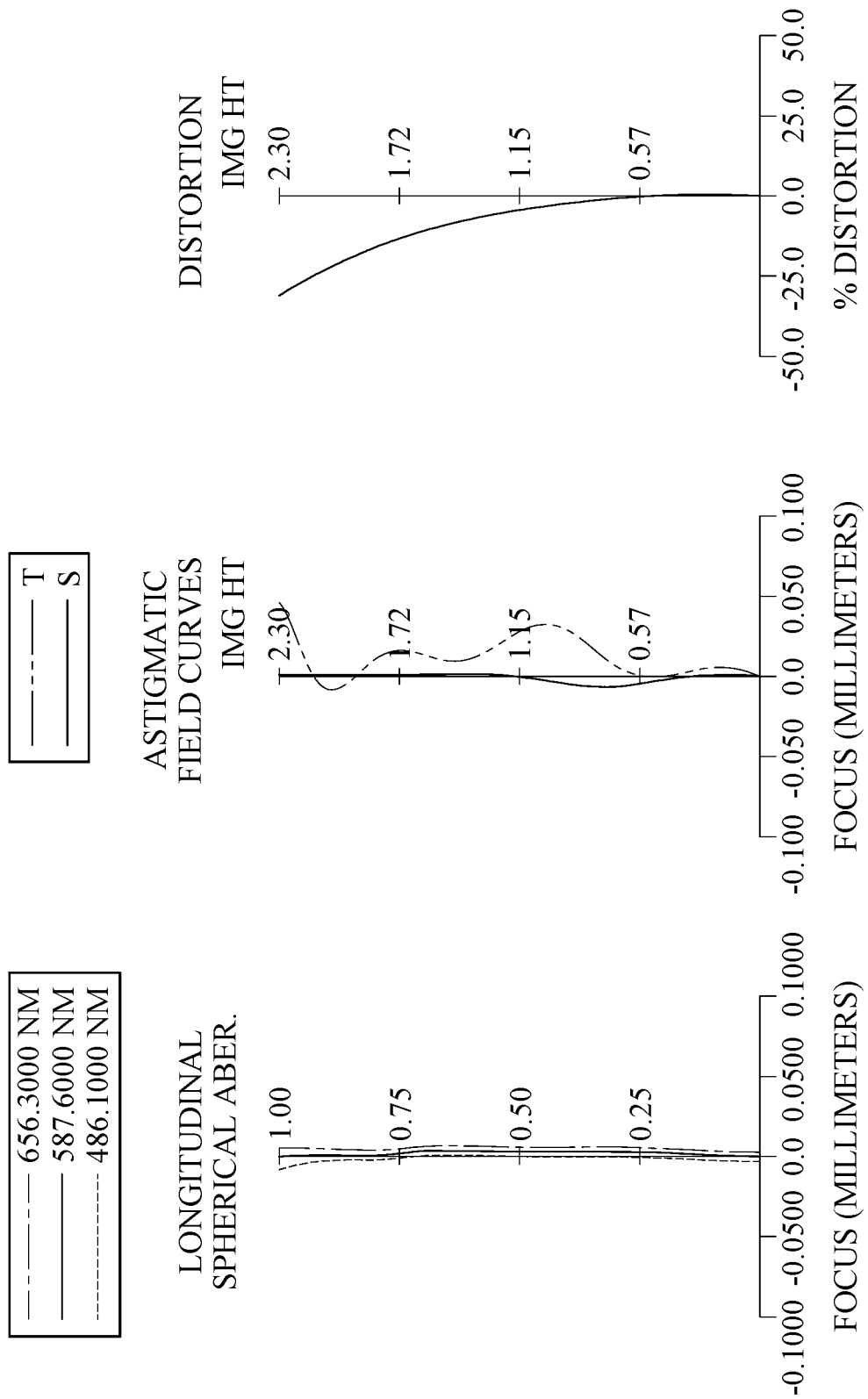
FIG. 6 shows spherical aberration curves, astigmatic field curves and a distortion curve of the image capturing unit according to the 3rd embodiment.

FIG. 6 shows, in order from left to right, spherical aberration curves, astigmatic field curves and a distortion curve of the image capturing unit according to the 3rd embodiment. In FIG. 5, the image capturing unit includes the photographing lens assembly (its reference numeral is omitted) of the present disclosure and an image sensor 390. The photographing lens assembly includes, in order from an object side to an image side, a first lens element 310, a first stop 301, a second lens element 320, an aperture stop 300, a third lens element 330, a second stop 302, a fourth lens element 340, a fifth lens element 350, a sixth lens element 360, an IR-cut filter 370 and an image surface 380. The photographing lens assembly includes six lens elements (310, 320, 330, 340, 350 and 360) with no additional lens element disposed between the first lens element 310 and the sixth lens element 360.

The first lens element 310 with negative refractive power has an object-side surface 311 being concave in a paraxial region thereof and an image-side surface 312 being concave in a paraxial region thereof. The first lens element 310 is made of plastic material and has the object-side surface 311 and the image-side surface 312 being both aspheric. The object-side surface 311 of the first lens element 310 has at least one convex critical point in an off-axis region thereof.

The second lens element 320 with positive refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being convex in a paraxial region thereof. The third lens element 330 is made of plastic material and has the object-side surface 331 and the image-side surface 332 being both aspheric. The object-side surface 331 of the third lens element 330 has at least one concave critical point in an off-axis region thereof.

The fourth lens element 340 with positive refractive power has an object-side surface 341 being convex in a paraxial region thereof and an image-side surface 342 being convex in a paraxial region thereof. The fourth lens element 340 is made of plastic material and has the object-side surface 341 and the image-side surface 342 being both aspheric.

The fifth lens element 350 with negative refractive power has an object-side surface 351 being concave in a paraxial region thereof and an image-side surface 352 being convex in a paraxial region thereof. The fifth lens element 350 is made of plastic material and has the object-side surface 351 and the image-side surface 352 being both aspheric. The image-side surface 352 of the fifth lens element 350 has at least one concave critical point in an off-axis region thereof.

The sixth lens element 360 with positive refractive power has an object-side surface 361 being convex in a paraxial region thereof and an image-side surface 362 being concave in a paraxial region thereof. The sixth lens element 360 is made of plastic material and has the object-side surface 361 and the image-side surface 362 being both aspheric. The object-side surface 361 of the sixth lens element 360 has at least one concave critical point in an off-axis region thereof. The image-side surface 362 of the sixth lens element 360 has at least one convex critical point in an off-axis region thereof.

The IR-cut filter 370 is made of glass material and located between the sixth lens element 360 and the image surface 380, and will not affect the focal length of the photographing lens assembly. The image sensor 390 is disposed on or near the image surface 380 of the photographing lens assembly.

The detailed optical data of the 3rd embodiment are shown in Table 5 and the aspheric surface data are shown in Table 6 below.

TABLE 5

3rd Embodiment
f = 1.97 mm, FNo = 2.43, HFOV = 60.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.726 | (ASP) | 0.295 | Plastic | 1.545 | 56.1 | −2.59 |
| 2 | | 3.046 | (ASP) | 0.361 | | | | |
| 3 | 1st Stop | Plano | | −0.088 | | | | |
| 4 | Lens 2 | 1.124 | (ASP) | 0.302 | Plastic | 1.614 | 26.0 | 17.28 |
| 5 | | 1.129 | (ASP) | 0.201 | | | | |
| 6 | Ape. Stop | Plano | | 0.023 | | | | |
| 7 | Lens 3 | 7.657 | (ASP) | 0.427 | Plastic | 1.545 | 56.1 | 3.22 |
| 8 | | −2.228 | (ASP) | −0.008 | | | | |
| 9 | 2nd Stop | Plano | | 0.103 | | | | |
| 10 | Lens 4 | 1.650 | (ASP) | 0.568 | Plastic | 1.545 | 56.0 | 1.42 |
| 11 | | −1.279 | (ASP) | 0.136 | | | | |
| 12 | Lens 5 | −0.690 | (ASP) | 0.270 | Plastic | 1.614 | 26.0 | −1.78 |
| 13 | | −2.164 | (ASP) | 0.239 | | | | |
| 14 | Lens 6 | 1.460 | (ASP) | 1.055 | Plastic | 1.544 | 56.0 | 7.68 |
| 15 | | 1.671 | (ASP) | 0.450 | | | | |
| 16 | IR-cut filter | Plano | | 0.110 | Glass | 1.517 | 64.2 | — |
| 17 | | Plano | | 0.336 | | | | |
| 18 | Image | Plano | | — | | | | |

Note:
Reference wavelength is 587.6 nm (d-line).
An effective radius of the first stop 301 (Surface 3) is 0.760 mm.
An effective radius of the second stop 302 (Surface 9) is 0.580 mm.
An effective radius of the image-side surface 342 (Surface 11) is 0.760 mm.

TABLE 6

Aspheric Coefficients

| Surface # | 1 | 2 | 4 | 5 | 7 | 8 |
|---|---|---|---|---|---|---|
| k = | −9.0000E+01 | −9.0000E+01 | 0.0000E+00 | −2.5875E+00 | −1.0227E+00 | 8.7838E−01 |
| A4 = | 3.5786E−01 | 1.2858E+00 | −1.2019E−01 | 1.9885E−01 | −2.2916E−01 | −1.4798E+00 |
| A6 = | −4.0367E−01 | −2.6000E+00 | −1.0938E+00 | −1.9634E+00 | −1.2909E+00 | 4.5768E+00 |
| A8 = | 3.4974E−01 | 4.7854E+00 | 3.6371E+00 | 1.5224E+01 | 7.0205E+00 | −1.4535E+01 |
| A10 = | −1.9091E−01 | −4.9090E+00 | −8.7633E+00 | −5.3234E+01 | −2.4884E+01 | 2.7036E+01 |

TABLE 6-continued

| Aspheric Coefficients | | | | | |
|---|---|---|---|---|---|
| A12 = 5.8562E−02 | 2.4832E+00 | 9.3878E+00 | 7.8496E+01 | 2.2674E+01 | −2.6646E+01 |
| A14 = −7.4800E−03 | −4.4657E−01 | −3.4178E+00 | — | — | — |

| Surface # | 10 | 11 | 12 | 13 | 14 | 15 |
|---|---|---|---|---|---|---|
| k = | −2.8218E+01 | −1.2738E+01 | −2.0878E+00 | −3.3094E+00 | −1.8452E+01 | −7.4936E+00 |
| A4 = | −4.8061E−01 | −8.4587E−01 | 9.4784E−02 | −5.5563E−02 | −1.3996E−01 | −8.6749E−02 |
| A6 = | 1.0739E+00 | 4.7020E−01 | 4.5012E−01 | 2.1570E+00 | 5.3708E−02 | 5.3038E−02 |
| A8 = | −1.1511E+00 | 5.4402E+00 | 1.8353E+00 | −5.4097E+00 | 4.6715E−02 | −3.8087E−02 |
| A10 = | 1.2282E+00 | −2.0446E+01 | −1.3588E+01 | 6.3799E+00 | −8.2739E−02 | 1.9653E−02 |
| A12 = | −7.5361E−01 | 2.9481E+00 | 2.1554E+01 | −4.0511E+00 | 4.5319E−02 | −6.5157E−03 |
| A14 = | −1.2008E+00 | −1.6204E+01 | −1.1022E+01 | 1.3505E+00 | −1.0774E−02 | 1.1875E−03 |
| A16 = | — | — | — | −1.8605E−01 | 8.6020E−04 | −9.0911E−05 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 1.97 | |R1/R2| | 0.89 |
| FNo | 2.43 | |f1/f6| | 0.34 |
| HFOV [deg.] | 60.1 | |f5/f4| | 1.25 |
| FOV [deg.] | 120.2 | |f/f2| + |f/f6| | 0.37 |
| T12/T23 | 1.22 | |f/f1| | 0.76 |
| (T12 + T56)/(T23 + T34 + T45) | 1.13 | |f/f3| | 0.61 |
| CT6/T56 | 4.41 | |f/f4| | 1.39 |
| TL/R1 | −1.75 | |f/f5| | 1.11 |
| Sag52/CT5 | −0.10 | f/CT6 | 1.87 |
| Y1R1/Y6R2 | 0.68 | (f/R3) + (f/R4) | 3.50 |
| (R5 + R6)/(R5 − R6) | 0.55 | — | — |

4th Embodiment

Figure 7:
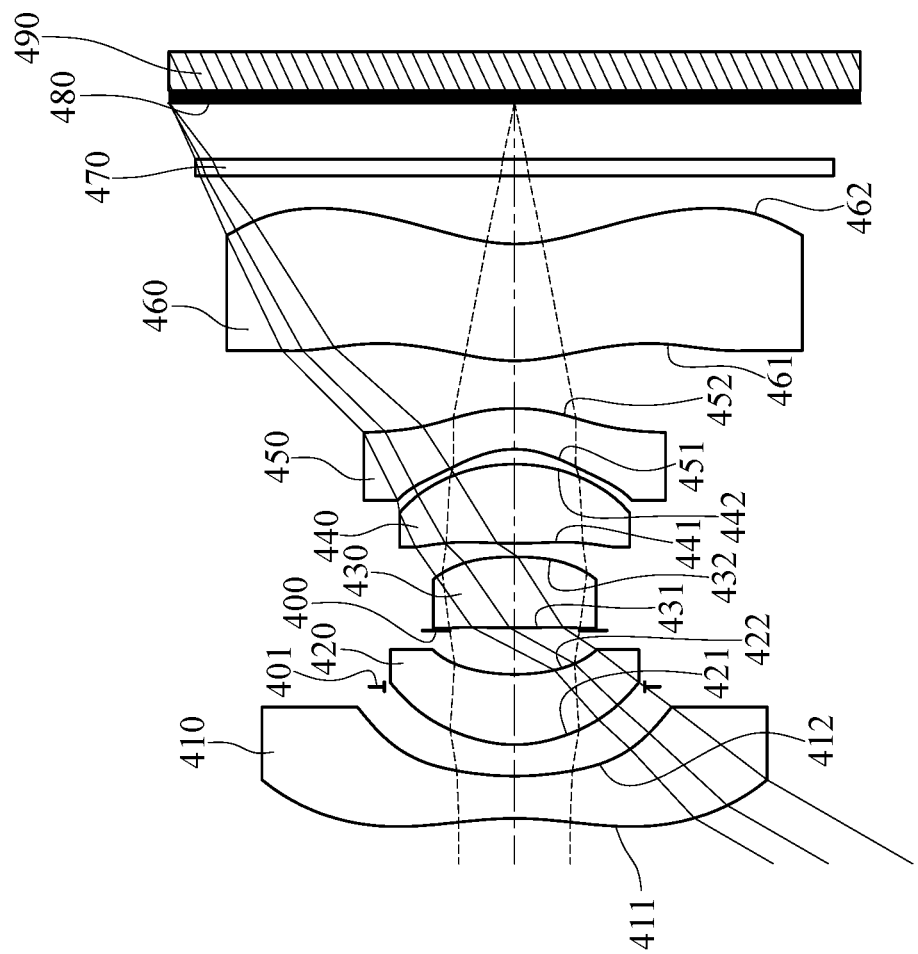
FIG. 7 is a schematic view of an image capturing unit according to the 4th embodiment of the present disclosure.
Figure 8:
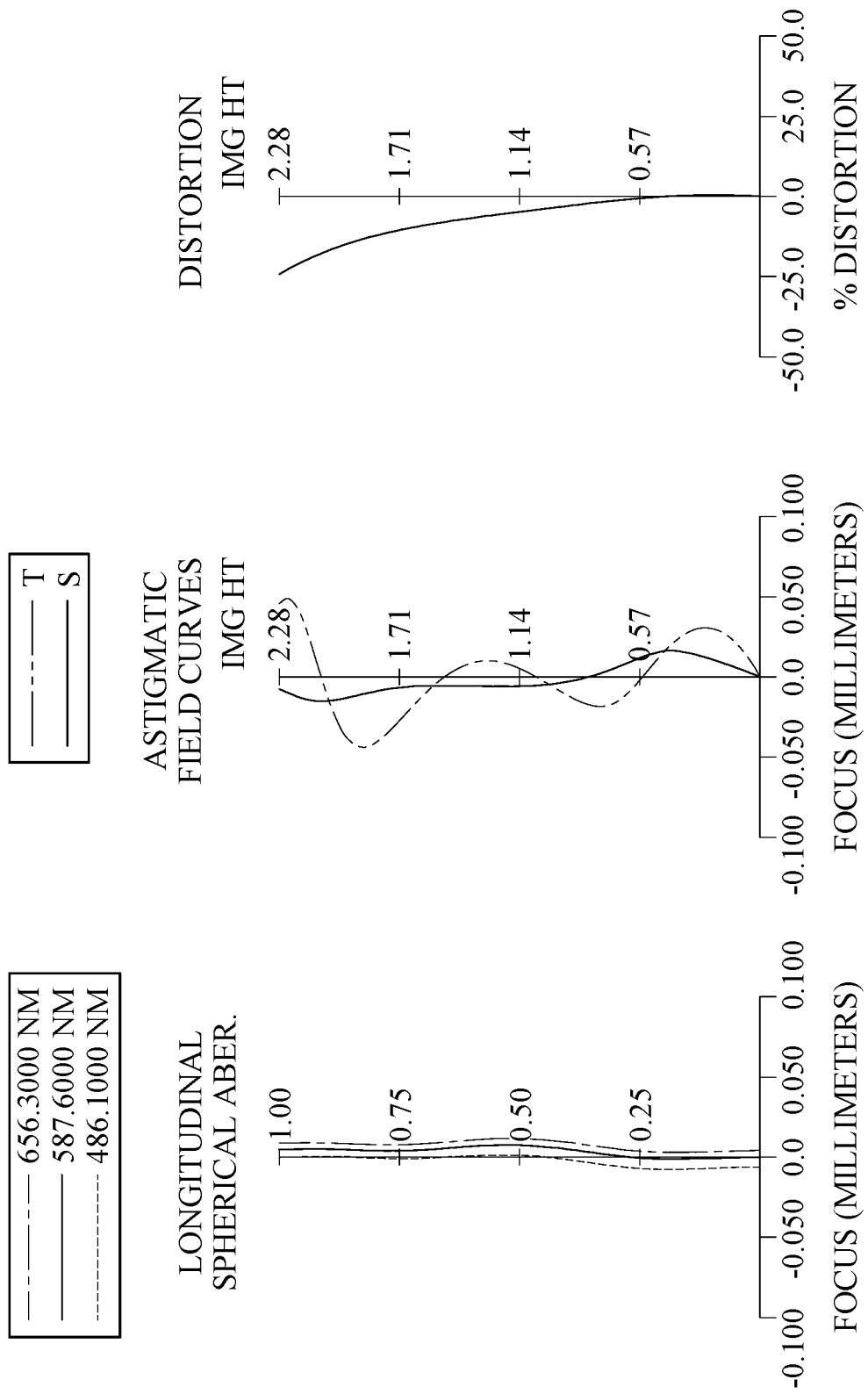
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the photographing lens assembly (its reference numeral is omitted) of the present disclosure and an image sensor 490. The photographing lens assembly includes, in order from an object side to an image side, a first lens element 410, a stop 401, a second lens element 420, an aperture stop 400, a third lens element 430, a fourth lens element 440, a fifth lens element 450, a sixth lens element 460, an IR-cut filter 470 and an image surface 480. The photographing lens assembly includes six lens elements (410, 420, 430, 440, 450 and 460) with no additional lens element disposed between the first lens element 410 and the sixth lens element 460.

The first lens element 410 with negative refractive power has an object-side surface 411 being concave in a paraxial region thereof and an image-side surface 412 being concave in a paraxial region thereof. The first lens element 410 is made of plastic material and has the object-side surface 411 and the image-side surface 412 being both aspheric. The object-side surface 411 of the first lens element 410 has at least one convex critical point in an off-axis region thereof.

The second lens element 420 with positive refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with positive refractive power has an object-side surface 431 being convex in a paraxial region thereof and an image-side surface 432 being convex in a paraxial region thereof. The third lens element 430 is made of plastic material and has the object-side surface 431 and the image-side surface 432 being both aspheric. The object-side surface 431 of the third lens element 430 has at least one concave critical point in an off-axis region thereof.

The fourth lens element 440 with positive refractive power has an object-side surface 441 being convex in a paraxial region thereof and an image-side surface 442 being convex in a paraxial region thereof. The fourth lens element 440 is made of plastic material and has the object-side surface 441 and the image-side surface 442 being both aspheric. The object-side surface 441 of the fourth lens element 440 has at least one concave critical point in an off-axis region thereof.

The fifth lens element 450 with negative refractive power has an object-side surface 451 being concave in a paraxial region thereof and an image-side surface 452 being convex in a paraxial region thereof. The fifth lens element 450 is made of plastic material and has the object-side surface 451 and the image-side surface 452 being both aspheric.

The sixth lens element 460 with positive refractive power has an object-side surface 461 being convex in a paraxial region thereof and an image-side surface 462 being concave in a paraxial region thereof. The sixth lens element 460 is made of plastic material and has the object-side surface 461 and the image-side surface 462 being both aspheric. The object-side surface 461 of the sixth lens element 460 has at least one concave critical point and at least one convex critical point in an off-axis region thereof. The image-side surface 462 of the sixth lens element 460 has at least one convex critical point in an off-axis region thereof.

The IR-cut filter 470 is made of glass material and located between the sixth lens element 460 and the image surface 480, and will not affect the focal length of the photographing lens assembly. The image sensor 490 is disposed on or near the image surface 480 of the photographing lens assembly.

The detailed optical data of the 4th embodiment are shown in Table 7 and the aspheric surface data are shown in Table 8 below.

TABLE 7

4th Embodiment
f = 1.77 mm, FNo = 2.40, HFOV = 60.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.318 | (ASP) | 0.280 | Plastic | 1.545 | 56.1 | −1.86 |
| 2 | | 1.885 | (ASP) | 0.591 | | | | |
| 3 | Stop | Plano | | −0.383 | | | | |
| 4 | Lens 2 | 0.862 | (ASP) | 0.465 | Plastic | 1.582 | 30.2 | 3.22 |
| 5 | | 1.279 | (ASP) | 0.290 | | | | |
| 6 | Ape. Stop | Plano | | 0.018 | | | | |
| 7 | Lens 3 | 9.593 | (ASP) | 0.469 | Plastic | 1.534 | 55.9 | 3.18 |
| 8 | | −2.024 | (ASP) | 0.089 | | | | |
| 9 | Lens 4 | 2.865 | (ASP) | 0.524 | Plastic | 1.545 | 56.1 | 1.59 |
| 10 | | −1.166 | (ASP) | 0.099 | | | | |
| 11 | Lens 5 | −0.625 | (ASP) | 0.270 | Plastic | 1.660 | 20.4 | −2.27 |
| 12 | | −1.255 | (ASP) | 0.315 | | | | |
| 13 | Lens 6 | 1.079 | (ASP) | 0.773 | Plastic | 1.544 | 56.0 | 7.67 |
| 14 | | 1.088 | (ASP) | 0.450 | | | | |
| 15 | IR-cut filter | Plano | | 0.110 | Glass | 1.517 | 64.2 | — |
| 16 | | Plano | | 0.372 | | | | |
| 17 | Image | Plano | | — | | | | |

Note:
Reference wavelength is 587.6 nm (d-line).
An effective radius of the stop 401 (Surface 3) is 0.860 mm.
An effective radius of the image-side surface 442 (Surface 10) is 0.760 mm.

TABLE 8

Aspheric Coefficients

| Surface # | 1 | 2 | 4 | 5 | 7 | 8 |
|---|---|---|---|---|---|---|
| k = | −1.0000E+00 | −2.5038E+01 | −2.5648E+00 | −3.9360E+01 | −9.0000E+01 | −3.6221E+01 |
| A4 = | 2.8488E−01 | 1.0572E−01 | −3.8153E−02 | 2.2321E+00 | −2.4425E−01 | −1.8935E+00 |
| A6 = | −1.6235E−01 | 3.2892E−01 | 2.6363E−01 | −1.3243E+01 | 1.6361E−01 | 5.3206E+00 |
| A8 = | 7.4425E−02 | −1.3769E−01 | 1.5027E+00 | 7.1932E+01 | −5.9417E+00 | −1.7236E+01 |
| A10 = | −2.3042E−02 | −3.8753E−02 | −3.0127E+00 | −2.0259E+02 | 1.9564E+01 | 3.5471E+01 |
| A12 = | 4.2203E−03 | 5.6968E−03 | 1.6102E+00 | 2.4148E+02 | −3.2067E+01 | −3.4817E+01 |
| A14 = | −3.3296E−04 | 4.9449E−03 | — | — | — | — |

| Surface # | 9 | 10 | 11 | 12 | 13 | 14 |
|---|---|---|---|---|---|---|
| k = | −9.0000E+01 | −1.6661E+01 | −1.3824E+00 | −5.6331E+00 | −1.0237E+01 | −6.3013E+00 |
| A4 = | −6.8478E−01 | −1.1984E+00 | 5.2788E−02 | −7.4019E−01 | −2.4818E−01 | −1.1252E−01 |
| A6 = | 7.1244E−01 | 2.1423E+00 | 2.5907E+00 | 4.2653E+00 | 3.0055E−01 | 8.2989E−02 |
| A8 = | −1.5332E+00 | 1.2697E+00 | −3.7899E+00 | −9.2112E+00 | −3.3830E−01 | −5.5403E−02 |
| A10 = | 8.8018E+00 | −1.6061E+01 | −7.2088E+00 | 1.1092E+01 | 2.3983E−01 | 2.3862E−02 |
| A12 = | −1.6266E+01 | 2.7444E+01 | 2.0042E+01 | −7.8849E+00 | −9.3228E−02 | −6.3738E−03 |
| A14 = | 9.5887E+00 | −1.5469E+01 | −1.3419E+01 | 3.1315E+00 | 1.8615E−02 | 9.3319E−04 |
| A16 = | — | — | — | −5.4534E−01 | −1.5061E−03 | −5.5305E−05 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 1.77 | |R1/R2| | 1.23 |
| FNo | 2.40 | |f1/f6| | 0.24 |
| HFOV [deg.] | 60.0 | |f5/f4| | 1.43 |
| FOV [deg.] | 120.0 | |f/f2| + |f/f6| | 0.78 |
| T12/T23 | 0.68 | |f/f1| | 0.95 |
| (T12 + T56)/(T23 + T34 + T45) | 1.05 | |f/f3| | 0.56 |
| CT6/T56 | 2.45 | |f/f4| | 1.11 |
| TL/R1 | −2.04 | |f/f5| | 0.78 |
| Sag52/CT5 | −0.59 | f/CT6 | 2.29 |
| Y1R1/Y6R2 | 0.88 | (f/R3) + (f/R4) | 3.44 |
| (R5 + R6)/(R5 − R6) | 0.65 | — | — |

5th Embodiment

Figure 9:
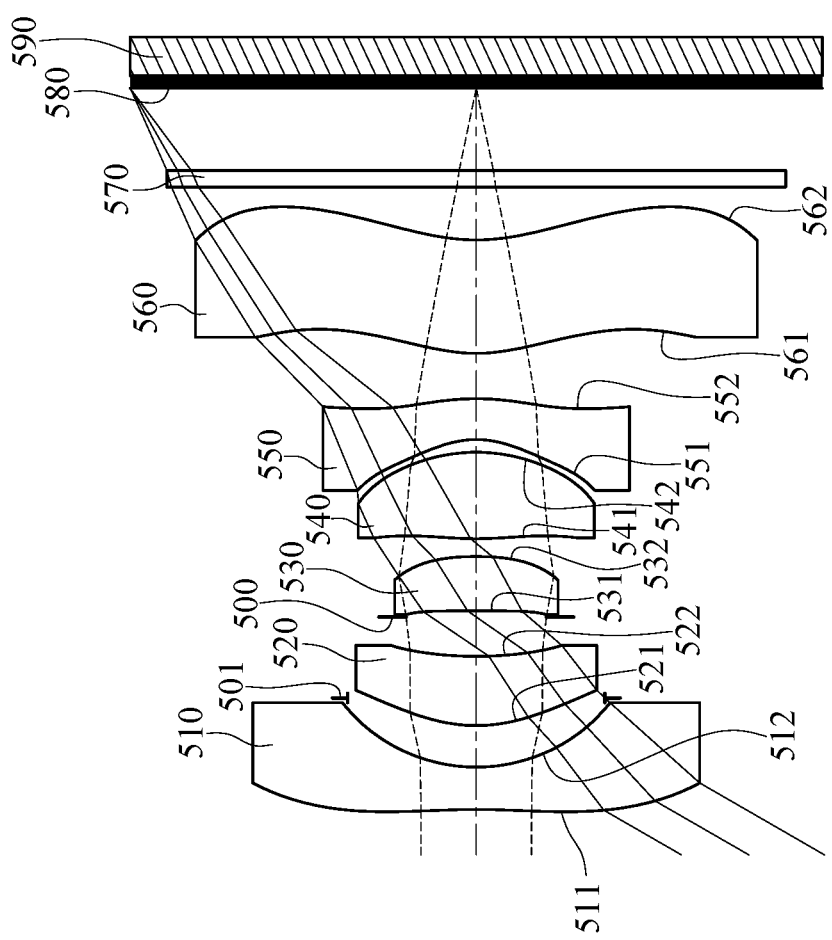
FIG. 9 is a schematic view of an image capturing unit according to the 5th embodiment of the present disclosure.
Figure 10:
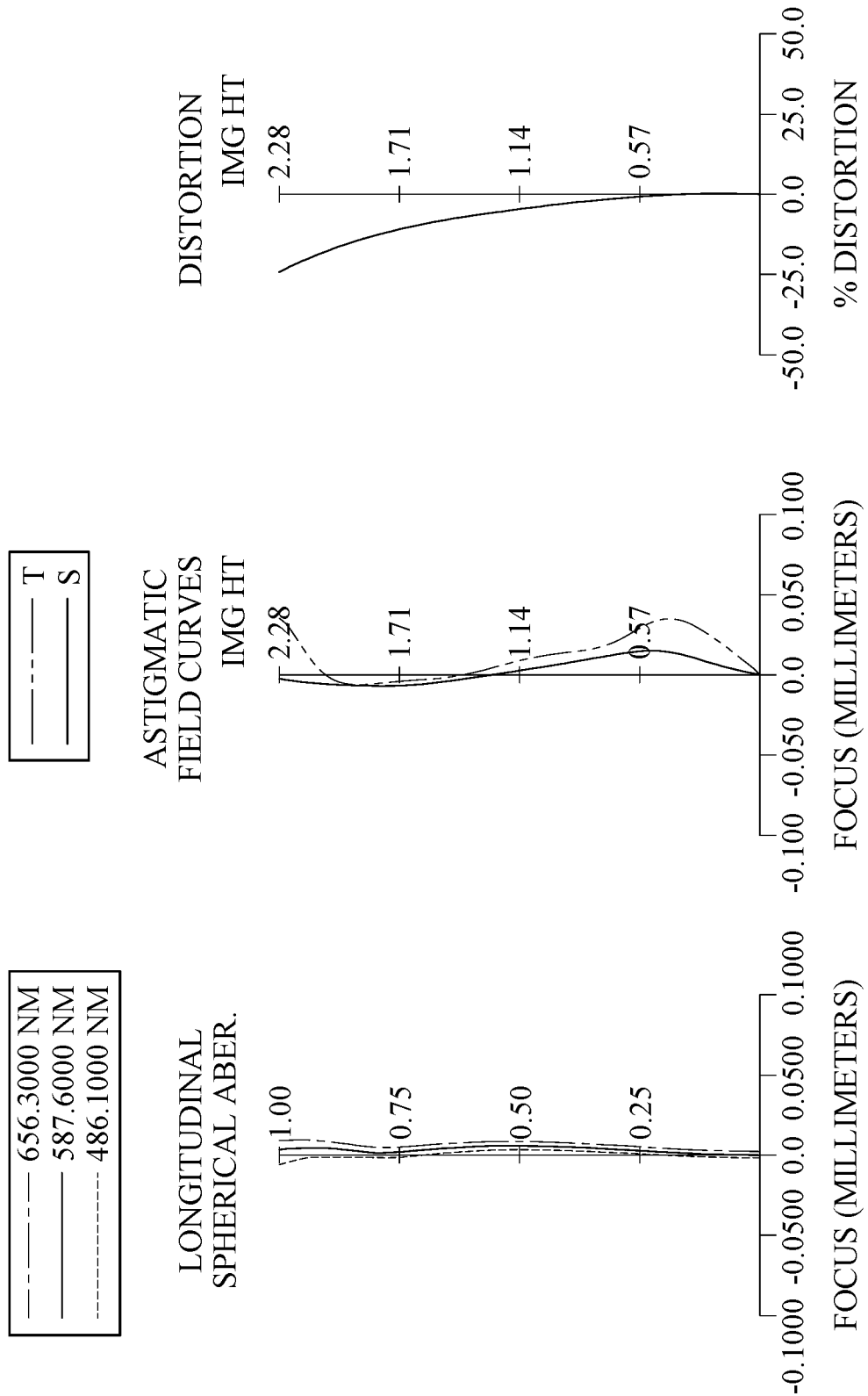
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the photographing lens assembly (its reference numeral is omitted) of the present disclosure and an image sensor 590. The photographing lens assembly includes, in order from an object side to an image side, a first lens element 510, a stop 501, a second lens element 520, an aperture stop 500, a third lens element 530, a fourth lens element 540, a fifth lens element 550, a sixth lens element 560, an IR-cut filter 570 and an image surface 580. The photographing lens assembly includes six lens elements (510, 520, 530, 540, 550 and 560) with no additional lens element disposed between the first lens element 510 and the sixth lens element 560.

The first lens element 510 with negative refractive power has an object-side surface 511 being concave in a paraxial region thereof and an image-side surface 512 being concave in a paraxial region thereof. The first lens element 510 is made of plastic material and has the object-side surface 511 and the image-side surface 512 being both aspheric. The object-side surface 511 of the first lens element 510 has at least one convex critical point in an off-axis region thereof.

The second lens element 520 with positive refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with positive refractive power has an object-side surface 531 being convex in a paraxial region thereof and an image-side surface 532 being convex in a paraxial region thereof. The third lens element 530 is made of plastic material and has the object-side surface 531 and the image-side surface 532 being both aspheric.

The fourth lens element 540 with positive refractive power has an object-side surface 541 being convex in a paraxial region thereof and an image-side surface 542 being convex in a paraxial region thereof. The fourth lens element 540 is made of plastic material and has the object-side surface 541 and the image-side surface 542 being both aspheric. The object-side surface 541 of the fourth lens element 540 has at least one concave critical point in an off-axis region thereof.

The fifth lens element 550 with negative refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric. The image-side surface 552 of the fifth lens element 550 has at least one concave critical point in an off-axis region thereof.

The sixth lens element 560 with positive refractive power has an object-side surface 561 being convex in a paraxial region thereof and an image-side surface 562 being concave in a paraxial region thereof. The sixth lens element 560 is made of plastic material and has the object-side surface 561 and the image-side surface 562 being both aspheric. The object-side surface 561 of the sixth lens element 560 has at least one concave critical point in an off-axis region thereof. The image-side surface 562 of the sixth lens element 560 has at least one convex critical point in an off-axis region thereof.

The IR-cut filter 570 is made of glass material and located between the sixth lens element 560 and the image surface 580, and will not affect the focal length of the photographing lens assembly. The image sensor 590 is disposed on or near the image surface 580 of the photographing lens assembly.

The detailed optical data of the 5th embodiment are shown in Table 9 and the aspheric surface data are shown in Table 10 below.

TABLE 9

5th Embodiment
f = 1.77 mm, FNo = 2.42, HFOV = 60.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −5.046 | (ASP) | 0.280 | Plastic | 1.545 | 56.1 | −1.63 |
| 2 | | 1.097 | (ASP) | 0.458 | | | | |
| 3 | Stop | Plano | | −0.183 | | | | |
| 4 | Lens 2 | 1.014 | (ASP) | 0.458 | Plastic | 1.566 | 37.6 | 2.71 |
| 5 | | 2.500 | (ASP) | 0.260 | | | | |
| 6 | Ape. Stop | Plano | | 0.040 | | | | |
| 7 | Lens 3 | 74.973 | (ASP) | 0.360 | Plastic | 1.545 | 56.1 | 3.51 |
| 8 | | −1.962 | (ASP) | 0.118 | | | | |
| 9 | Lens 4 | 2.250 | (ASP) | 0.572 | Plastic | 1.545 | 56.1 | 1.43 |
| 10 | | −1.087 | (ASP) | 0.084 | | | | |
| 11 | Lens 5 | −0.601 | (ASP) | 0.270 | Plastic | 1.639 | 23.5 | −1.63 |
| 12 | | −1.664 | (ASP) | 0.300 | | | | |
| 13 | Lens 6 | 1.073 | (ASP) | 0.750 | Plastic | 1.544 | 56.0 | 5.34 |
| 14 | | 1.283 | (ASP) | 0.350 | | | | |
| 15 | IR-cut filter | Plano | | 0.110 | Glass | 1.517 | 64.2 | — |
| 16 | | Plano | | 0.543 | | | | |
| 17 | Image | Plano | | — | | | | |

Note:
Reference wavelength is 587.6 nm (d-line).
An effective radius of the stop 501 (Surface 3) is 0.850 mm.
An effective radius of the image-side surface 532 (Surface 8) is 0.540 mm.
An effective radius of the image-side surface 542 (Surface 10) is 0.780 mm.

TABLE 10

Aspheric Coefficients

| Surface # | 1 | 2 | 4 | 5 | 7 | 8 |
|---|---|---|---|---|---|---|
| k = | −1.0000E+00 | −6.7824E+00 | −2.7807E+00 | −8.5071E+00 | −9.9000E+01 | 7.7183E−02 |
| A4 = | 1.9958E−01 | 4.9078E−01 | −1.2761E−02 | 8.5520E−02 | −3.3575E−01 | −1.1610E+00 |
| A6 = | −1.4646E−01 | −5.2990E−01 | −1.4096E−01 | 1.4145E−01 | −5.7070E−01 | 2.1851E+00 |
| A8 = | 9.1338E−02 | 5.9621E−01 | 1.4623E−01 | −9.3943E−01 | −7.7578E−01 | −7.4686E+00 |
| A10 = | −3.7156E−02 | −1.6839E−01 | −3.9593E−02 | 3.9558E+00 | −2.1305E+00 | 1.4907E+01 |
| A12 = | 8.6125E−03 | −1.2035E−01 | — | −2.3031E+00 | −1.2282E+01 | −2.0160E+01 |
| A14 = | −8.4514E−04 | 5.1698E−02 | — | — | — | — |

| Surface # | 9 | 10 | 11 | 12 | 13 | 14 |
|---|---|---|---|---|---|---|
| k = | −1.2838E+00 | −2.0557E+00 | −1.3069E+00 | −5.0307E+00 | −8.8644E+00 | −6.6989E+00 |
| A4 = | −8.5623E−01 | 2.4577E−01 | 1.1845E+00 | 7.7241E−02 | −1.0800E−01 | −7.5411E−02 |
| A6 = | 1.5923E+00 | −3.2781E+00 | −3.2385E+00 | 1.3149E+00 | 2.6347E−03 | 2.8305E−02 |
| A8 = | −4.4442E+00 | 1.4201E+01 | 1.0468E+01 | −3.2483E+00 | 5.6587E−02 | −1.1975E−02 |
| A10 = | 1.3747E+01 | −3.3103E+01 | −2.4324E+01 | 3.5185E+00 | −6.3255E−02 | 3.3015E−03 |
| A12 = | −2.2508E+01 | 3.7104E+01 | 2.6424E+01 | −1.9717E+00 | 3.2341E−02 | −7.3105E−04 |
| A14 = | 1.3336E+01 | −1.6515E+01 | −1.0839E+01 | 5.4986E−01 | −7.7456E−03 | 1.0240E−04 |
| A16 = | — | — | — | −6.0177E−02 | 7.0213E−04 | −6.7178E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 1.77 | |R1/R2| | 4.60 |
| FNo | 2.42 | |f1/f6| | 0.31 |
| HFOV [deg.] | 60.0 | |f5/f4| | 1.14 |
| FOV [deg.] | 120.0 | |f/f2| + |f/f6| | 0.98 |
| T12/T23 | 0.92 | |f/f1| | 1.09 |
| (T12 + T56)/(T23 + T34 + T45) | 1.15 | |f/f3| | 0.50 |
| CT6/T56 | 2.50 | |f/f4| | 1.24 |
| TL/R1 | −0.95 | |f/f5| | 1.09 |
| Sag52/CT5 | −0.20 | f/CT6 | 2.36 |
| Y1R1/Y6R2 | 0.80 | |(f/R3) + (f/R4)| | 2.45 |
| (R5 + R6)/(R5 − R6) | 0.95 | — | — |

6th Embodiment

Figure 11:
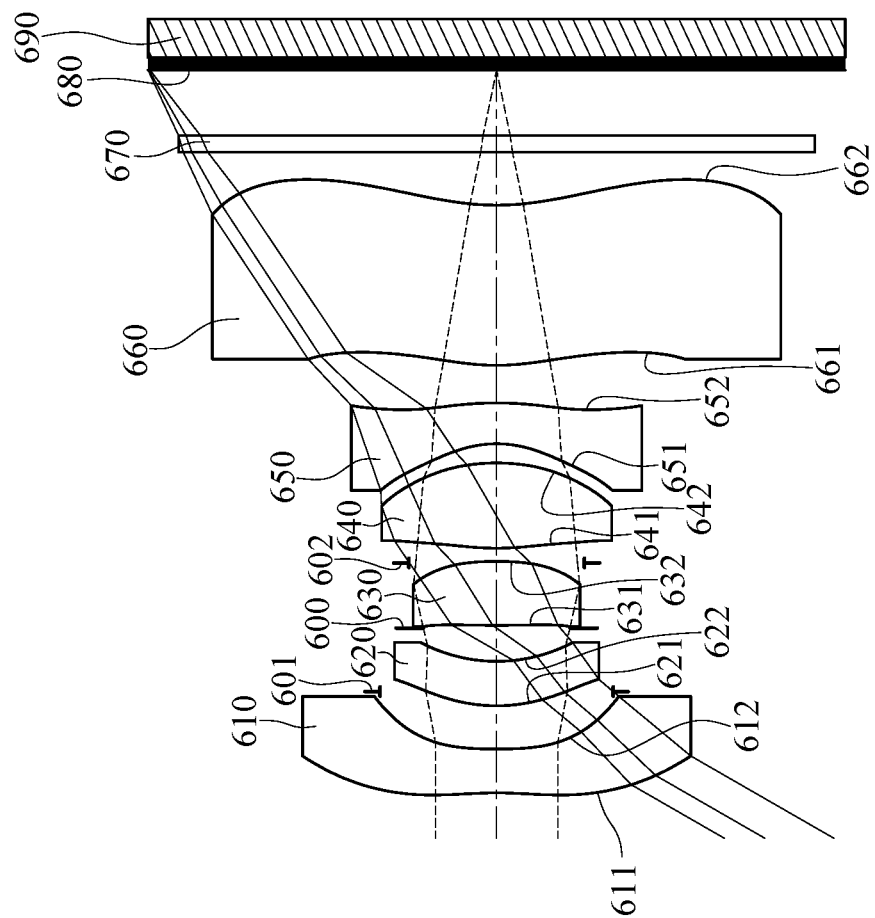
FIG. 11 is a schematic view of an image capturing unit according to the 6th embodiment of the present disclosure.
Figure 12:
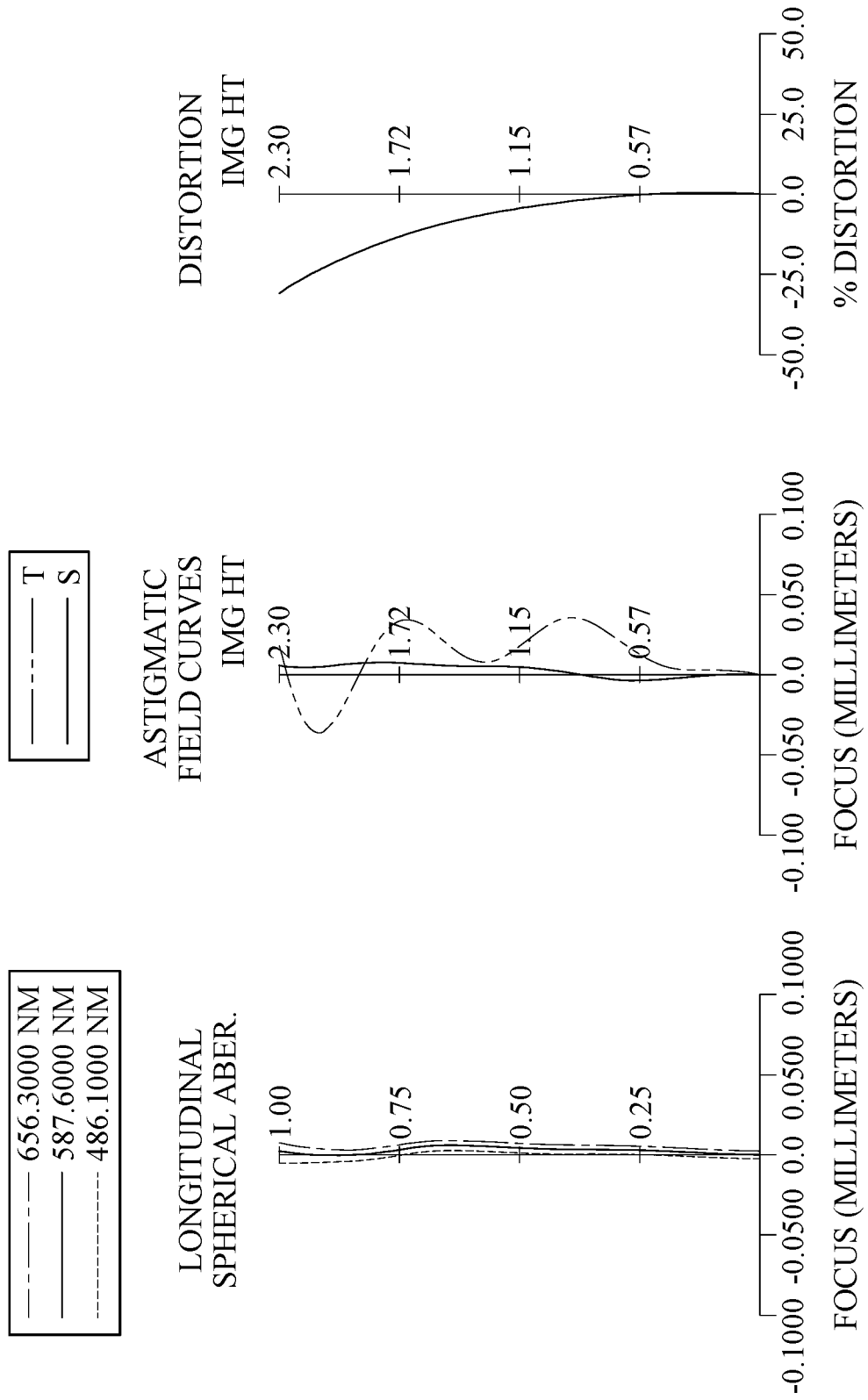
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the photographing lens assembly (its reference numeral is omitted) of the present disclosure and an image sensor 690. The photographing lens assembly includes, in order from an object side to an image side, a first lens element 610, a first stop 601, a second lens element 620, an aperture stop 600, a third lens element 630, a second stop 602, a fourth lens element 640, a fifth lens element 650, a sixth lens element 660, an IR-cut filter 670 and an image surface 680. The photographing lens assembly includes six lens elements (610, 620, 630, 640, 650 and 660) with no additional lens element disposed between the first lens element 610 and the sixth lens element 660.

The first lens element 610 with negative refractive power has an object-side surface 611 being concave in a paraxial region thereof and an image-side surface 612 being concave in a paraxial region thereof. The first lens element 610 is made of plastic material and has the object-side surface 611 and the image-side surface 612 being both aspheric. The object-side surface 611 of the first lens element 610 has at least one convex critical point in an off-axis region thereof.

The second lens element 620 with positive refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being convex in a paraxial region thereof. The third lens element 630 is made of plastic material and has the object-side surface 631 and the image-side surface 632 being both aspheric. The object-side surface 631 of the third lens element 630 has at least one concave critical point in an off-axis region thereof.

The fourth lens element 640 with positive refractive power has an object-side surface 641 being convex in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with negative refractive power has an object-side surface 651 being concave in a paraxial region thereof and an image-side surface 652 being convex in a paraxial region thereof. The fifth lens element 650 is made of plastic material and has the object-side surface 651 and the image-side surface 652 being both aspheric. The image-side surface 652 of the fifth lens element 650 has at least one concave critical point in an off-axis region thereof.

The sixth lens element 660 with positive refractive power has an object-side surface 661 being convex in a paraxial region thereof and an image-side surface 662 being concave in a paraxial region thereof. The sixth lens element 660 is made of plastic material and has the object-side surface 661 and the image-side surface 662 being both aspheric. The object-side surface 661 of the sixth lens element 660 has at least one concave critical point in an off-axis region thereof. The image-side surface 662 of the sixth lens element 660 has at least one convex critical point in an off-axis region thereof.

The IR-cut filter 670 is made of glass material and located between the sixth lens element 660 and the image surface 680, and will not affect the focal length of the photographing lens assembly. The image sensor 690 is disposed on or near the image surface 680 of the photographing lens assembly.

The detailed optical data of the 6th embodiment are shown in Table 11 and the aspheric surface data are shown in Table 12 below.

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

TABLE 11

6th Embodiment
f = 1.96 mm, FNo = 2.43, HFOV = 60.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.537 | (ASP) | 0.290 | Plastic | 1.545 | 56.1 | −2.78 |
| 2 | | 3.922 | (ASP) | 0.380 | | | | |
| 3 | 1st Stop | Plano | | −0.094 | | | | |
| 4 | Lens 2 | 1.095 | (ASP) | 0.294 | Plastic | 1.614 | 26.0 | 25.86 |
| 5 | | 1.056 | (ASP) | 0.220 | | | | |
| 6 | Ape. Stop | Plano | | 0.018 | | | | |
| 7 | Lens 3 | 7.942 | (ASP) | 0.423 | Plastic | 1.545 | 56.1 | 3.37 |
| 8 | | −2.347 | (ASP) | −0.010 | | | | |
| 9 | 2nd Stop | Plano | | 0.097 | | | | |
| 10 | Lens 4 | 1.576 | (ASP) | 0.564 | Plastic | 1.545 | 56.1 | 1.44 |
| 11 | | −1.362 | (ASP) | 0.127 | | | | |
| 12 | Lens 5 | −0.733 | (ASP) | 0.270 | Plastic | 1.614 | 26.0 | −1.85 |
| 13 | | −2.366 | (ASP) | 0.249 | | | | |
| 14 | Lens 6 | 1.439 | (ASP) | 1.059 | Plastic | 1.544 | 56.0 | 7.41 |
| 15 | | 1.658 | (ASP) | 0.350 | | | | |
| 16 | IR-cut filter | Plano | | 0.110 | Glass | 1.517 | 64.2 | — |
| 17 | | Plano | | 0.433 | | | | |
| 18 | Image | Plano | | — | | | | |

Note:
Reference wavelength is 587.6 nm (d-line).
An effective radius of the first stop 601 (Surface 3) is 0.770 mm.
An effective radius of the second stop 602 (Surface 9) is 0.580 mm.
An effective radius of the image-side surface 642 (Surface 11) is 0.760 mm.

TABLE 12

Aspheric Coefficients

| Surface # | 1 | 2 | 4 | 5 | 7 | 8 |
|---|---|---|---|---|---|---|
| k = | −9.0000E+01 | −9.0000E+01 | 0.0000E+00 | −2.0997E+00 | −4.1434E+00 | −9.4913E−02 |
| A4 = | 3.9518E−01 | 1.3264E+00 | 1.1274E−02 | 2.6341E−01 | −2.2861E−01 | −1.6234E+00 |
| A6 = | −4.3867E−01 | −2.4654E+00 | −1.1371E+00 | −1.7414E+00 | −1.2910E+00 | 5.3124E+00 |
| A8 = | 3.5136E−01 | 4.4646E+00 | 3.5494E+00 | 1.3351E+01 | 6.6395E+00 | −1.7149E+01 |
| A10 = | −1.7611E−01 | −4.7534E+00 | −9.5389E+00 | −5.0238E+01 | −2.4178E+01 | 3.2222E+01 |
| A12 = | 4.9188E−02 | 2.4832E+00 | 1.1237E+01 | 7.8496E+01 | 2.2674E+01 | −3.1217E+01 |
| A14 = | −5.7757E−03 | −4.4657E−01 | −4.5597E+00 | — | — | — |

| Surface # | 10 | 11 | 12 | 13 | 14 | 15 |
|---|---|---|---|---|---|---|
| k = | −2.6058E+01 | −1.4812E+01 | −2.2063E+00 | −1.4343E+00 | −1.8167E+01 | −8.1466E+00 |
| A4 = | −5.4293E−01 | −9.1383E−01 | −1.7661E−01 | −1.8693E−01 | −1.5004E−01 | −8.0039E−02 |
| A6 = | 1.3935E+00 | 2.9724E−01 | 1.3579E+00 | 2.7060E+00 | 9.7392E−02 | 4.7279E−02 |
| A8 = | −1.9404E+00 | 7.7542E+00 | 1.4133E+00 | −6.3740E+00 | −5.0415E−02 | −3.5296E−02 |
| A10 = | 2.6706E+00 | −2.6422E+01 | −1.5796E+01 | 7.3285E+00 | 2.9829E−02 | 1.8474E−02 |
| A12 = | −2.9220E+00 | 3.5425E+01 | 2.5244E+01 | −4.5671E+00 | −2.3214E−02 | −6.0693E−03 |
| A14 = | 4.5367E−01 | −1.8121E+01 | −1.2712E+01 | 1.4966E+00 | 9.2054E−03 | 1.0922E−03 |
| A16 = | — | — | — | −2.0363E−01 | −1.2223E−03 | −8.3492E−05 |

| 6th Embodiment | | | |
|---|---|---|---|
| f [mm] | 1.96 | |R1/R2| | 0.65 |
| FNo | 2.43 | |f1/f6| | 0.38 |
| HFOV [deg.] | 60.0 | |f5/f4| | 1.28 |
| FOV [deg.] | 120.0 | |f/f2| + |f/f6| | 0.34 |
| T12/T23 | 1.20 | |f/f1| | 0.71 |
| (T12 + T56)/(T23 + T34 + T45) | 1.18 | |f/f3| | 0.58 |
| CT6/T56 | 4.25 | |f/f4| | 1.36 |
| TL/R1 | −1.88 | |f/f5| | 1.06 |
| Sag52/CT5 | −0.06 | f/CT6 | 1.85 |
| Y1R1/Y6R2 | 0.68 | (f/R3) + (f/R4) | 3.65 |
| (R5 + R6)/(R5 − R6) | 0.54 | — | — |

7th Embodiment

Figure 13:
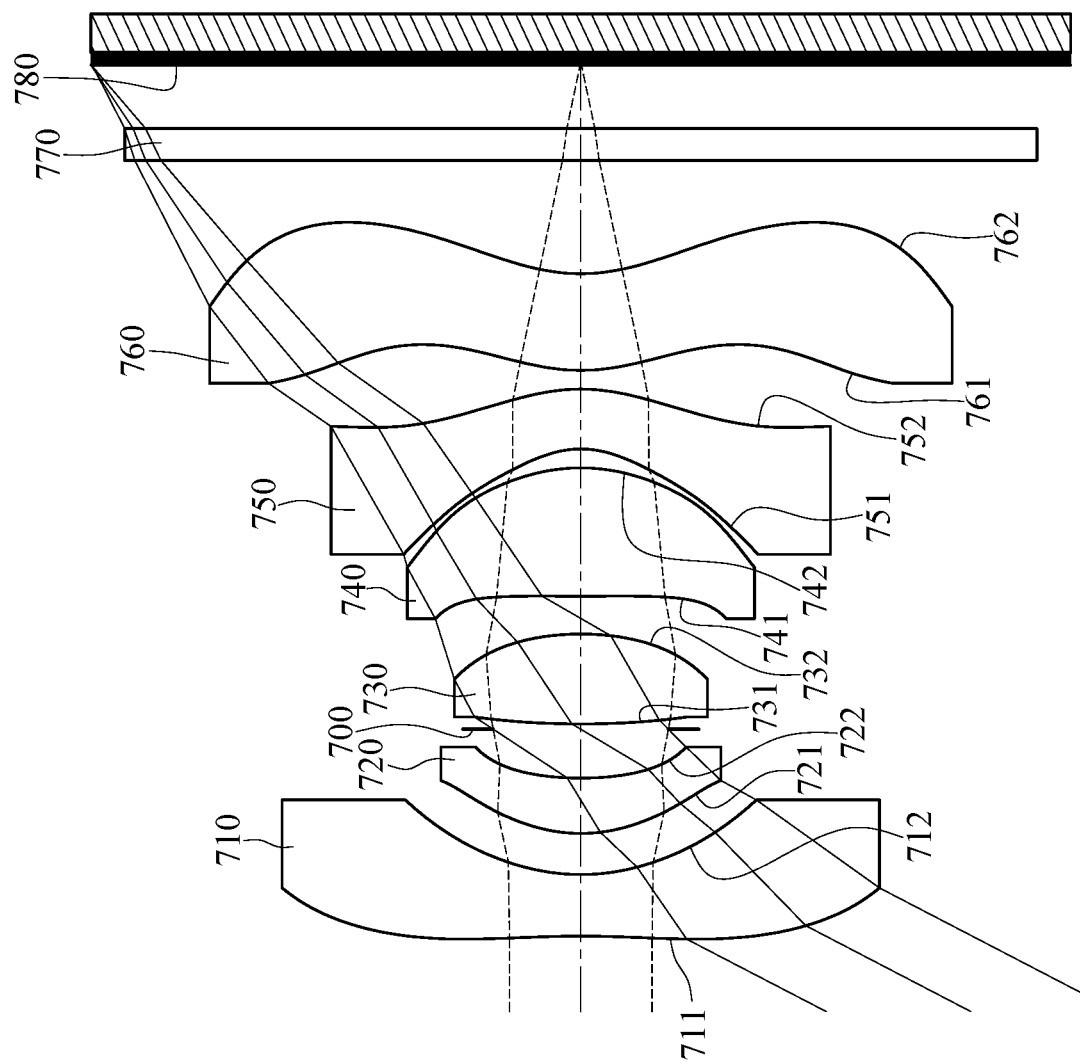
FIG. 13 is a schematic view of an image capturing unit according to the 7th embodiment of the present disclosure.
Figure 14:
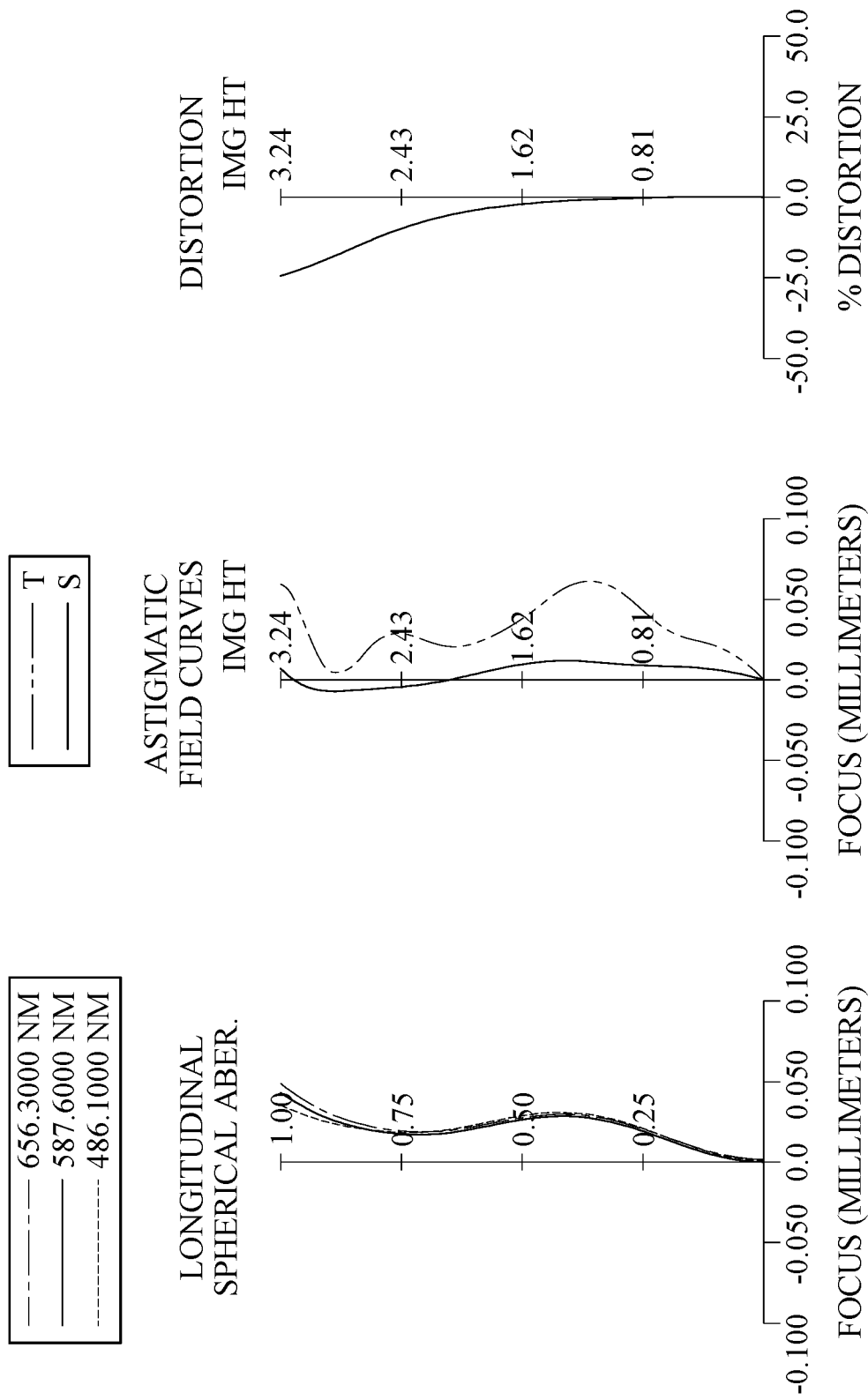
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the photographing lens assembly (its reference numeral is omitted) of the present disclosure and an image sensor 790. The photographing lens assembly includes, in order from an object side to an image side, a first lens element 710, a second lens element 720, an aperture stop 700, a third lens element 730, a fourth lens element 740, a fifth lens element 750, a sixth lens element 760, an IR-cut filter 770 and an image surface 780. The photographing lens assembly includes six lens elements (710, 720, 730, 740, 750 and 760) with no additional lens element disposed between the first lens element 710 and the sixth lens element 760.

The first lens element 710 with negative refractive power has an object-side surface 711 being concave in a paraxial region thereof and an image-side surface 712 being concave in a paraxial region thereof. The first lens element 710 is made of plastic material and has the object-side surface 711 and the image-side surface 712 being both aspheric. The object-side surface 711 of the first lens element 710 has at least one convex critical point in an off-axis region thereof.

The second lens element 720 with positive refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with positive refractive power has an object-side surface 731 being convex in a paraxial region thereof and an image-side surface 732 being convex in a paraxial region thereof. The third lens element 730 is made of plastic material and has the object-side surface 731 and the image-side surface 732 being both aspheric.

The fourth lens element 740 with positive refractive power has an object-side surface 741 being convex in a paraxial region thereof and an image-side surface 742 being convex in a paraxial region thereof. The fourth lens element 740 is made of plastic material and has the object-side surface 741 and the image-side surface 742 being both aspheric. The object-side surface 741 of the fourth lens element 740 has at least one concave critical point in an off-axis region thereof.

The fifth lens element 750 with negative refractive power has an object-side surface 751 being concave in a paraxial region thereof and an image-side surface 752 being convex in a paraxial region thereof. The fifth lens element 750 is made of plastic material and has the object-side surface 751 and the image-side surface 752 being both aspheric. The image-side surface 752 of the fifth lens element 750 has at least one concave critical point in an off-axis region thereof.

The sixth lens element 760 with positive refractive power has an object-side surface 761 being convex in a paraxial region thereof and an image-side surface 762 being concave in a paraxial region thereof. The sixth lens element 760 is made of plastic material and has the object-side surface 761 and the image-side surface 762 being both aspheric. The object-side surface 761 of the sixth lens element 760 has at least one concave critical point in an off-axis region thereof. The image-side surface 762 of the sixth lens element 760 has at least one convex critical point in an off-axis region thereof.

The IR-cut filter 770 is made of glass material and located between the sixth lens element 760 and the image surface 780, and will not affect the focal length of the photographing lens assembly. The image sensor 790 is disposed on or near the image surface 780 of the photographing lens assembly.

The detailed optical data of the 7th embodiment are shown in Table 13 and the aspheric surface data are shown in Table 14 below.

TABLE 13

7th Embodiment
f = 2.26 mm, FNo = 2.40, HFOV = 62.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −6.391 | (ASP) | 0.407 | Plastic | 1.545 | 56.0 | −2.04 |
| 2 | | 1.371 | (ASP) | 0.272 | | | | |
| 3 | Lens 2 | 1.035 | (ASP) | 0.366 | Plastic | 1.544 | 55.9 | 3.36 |
| 4 | | 2.089 | (ASP) | 0.323 | | | | |
| 5 | Ape. Stop | Plano | | 0.035 | | | | |
| 6 | Lens 3 | 5.594 | (ASP) | 0.595 | Plastic | 1.544 | 55.9 | 2.54 |
| 7 | | −1.767 | (ASP) | 0.250 | | | | |
| 8 | Lens 4 | 33.623 | (ASP) | 0.849 | Plastic | 1.544 | 55.9 | 2.17 |
| 9 | | −1.215 | (ASP) | 0.125 | | | | |
| 10 | Lens 5 | −0.620 | (ASP) | 0.396 | Plastic | 1.660 | 20.4 | −2.66 |
| 11 | | −1.203 | (ASP) | 0.124 | | | | |
| 12 | Lens 6 | 1.284 | (ASP) | 0.639 | Plastic | 1.544 | 55.9 | 19.77 |
| 13 | | 1.203 | (ASP) | 0.750 | | | | |

TABLE 13-continued

7th Embodiment
f = 2.26 mm, FNo = 2.40, HFOV = 62.5 deg.

| Surface # | | Curvature Radius | Thickness | Material | Index | Abbe # | Focal Length |
|---|---|---|---|---|---|---|---|
| 14 | IR-cut filter | Plano | 0.210 | Glass | 1.517 | 64.2 | — |
| 15 | | Plano | 0.420 | | | | |
| 16 | Image | Plano | — | | | | |

Note:
Reference wavelength is 587.6 nm (d-line).

TABLE 14

| Aspheric Coefficients | | | | | | |
|---|---|---|---|---|---|---|
| Surface # | 1 | 2 | 3 | 4 | 6 | 7 |
| k = | −5.6826E−01 | −3.5940E−01 | −7.2456E+00 | −8.3313E+00 | −1.1631E+01 | −5.8671E+00 |
| A4 = | 9.3899E−02 | −1.0805E−01 | 5.7017E−01 | 3.6665E−01 | 1.1520E−02 | −2.5653E−01 |
| A6 = | −3.9778E−02 | 1.5211E−01 | −1.2912E+00 | −4.2109E−01 | 1.0624E−01 | 1.4694E−02 |
| A8 = | 1.4389E−02 | −1.4200E−01 | 2.3374E+00 | 2.6294E+00 | −5.3765E−01 | −4.7381E−02 |
| A10 = | −3.3355E−03 | 6.9825E−02 | −2.3887E+00 | −5.3765E+00 | 1.0823E+00 | −8.2475E−02 |
| A12 = | 4.4882E−04 | −1.5129E−02 | 8.7873E−01 | 5.2599E+00 | −7.8266E−01 | 7.2483E−02 |
| A14= | −2.4670E−05 | — | — | — | — | — |
| Surface # | 8 | 9 | 10 | 11 | 12 | 13 |
| k = | −1.2244E+01 | −1.0555E+00 | −2.5790E+00 | −6.0974E+00 | −1.4971E+00 | −1.6803E+00 |
| A4 = | −1.0405E−01 | −7.2149E−02 | 3.1426E−01 | 2.5724E−02 | −2.8009E−01 | −1.7559E−01 |
| A6 = | 4.2330E−02 | 6.0700E−01 | 2.7171E−01 | 4.5380E−02 | 1.1712E−01 | 7.3294E−02 |
| A8 = | −1.6955E−01 | −1.5376E+00 | −8.7025E−01 | −3.2678E−02 | −3.9128E−02 | −2.1710E−02 |
| A10 = | 9.3788E−02 | 1.4797E+00 | 7.4126E−01 | 9.4117E−03 | 9.7782E−03 | 4.0404E−03 |
| A12 = | −7.5502E−02 | −6.6179E−01 | −2.0404E−01 | −4.9656E−04 | −1.3638E−03 | −4.3760E−04 |
| A14 = | — | 1.2110E−01 | — | −3.9166E−04 | 7.6227E−05 | 2.0446E−05 |
| A16 = | — | — | — | 6.7004E−05 | — | — |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 2.26 | |R1/R2| | 4.66 |
| FNo | 2.40 | |f1/f6| | 0.10 |
| HFOV [deg.] | 62.5 | |f5/f4| | 1.23 |
| FOV [deg.] | 125.0 | |f/f2| + |f/f6| | 0.79 |
| T12/T23 | 0.76 | |f/f1| | 1.11 |
| (T12 + T56)/(T23 + T34 + T45) | 0.54 | |f/f3| | 0.89 |
| CT6/T56 | 5.15 | |f/f4| | 1.04 |
| TL/R1 | −0.90 | |f/f5| | 0.85 |
| Sag52/CT5 | −0.62 | f/CT6 | 3.54 |
| Y1R1/Y6R2 | 0.80 | (f/R3) + (f/R4) | 3.27 |
| (R5 + R6)/(R5 − R6) | 0.52 | — | — |

8th Embodiment

Figure 15:
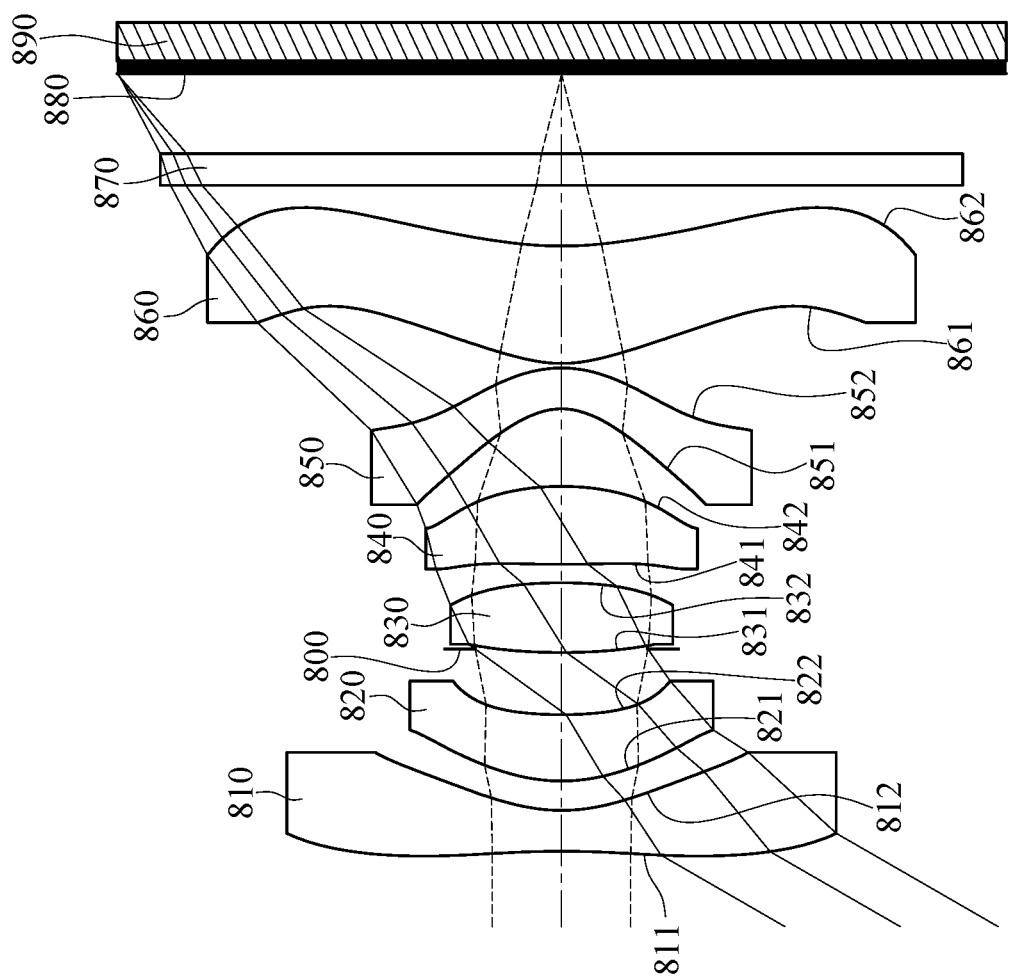
FIG. 15 is a schematic view of an image capturing unit according to the 8th embodiment of the present disclosure.
Figure 16:
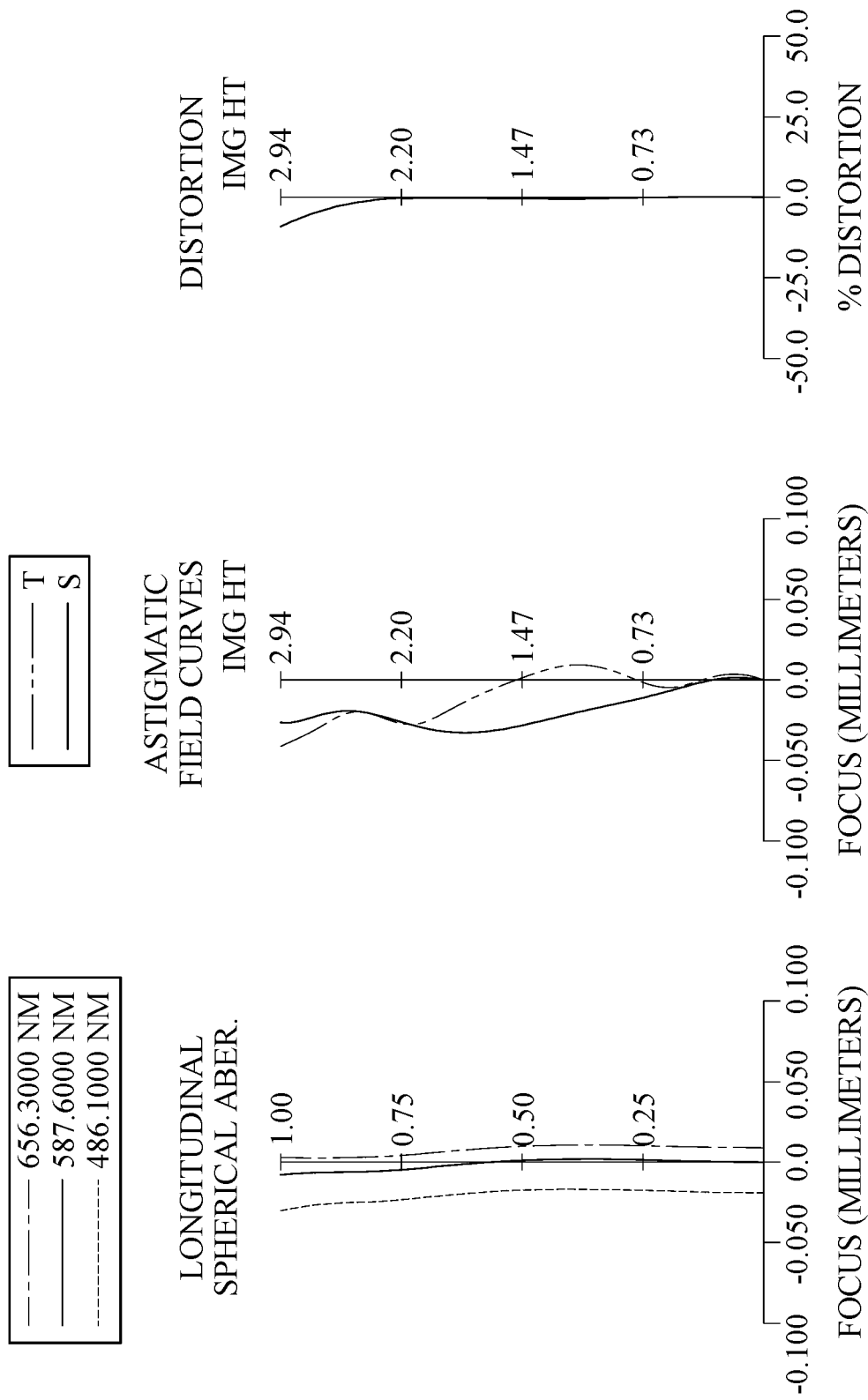
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the photographing lens assembly (its reference numeral is omitted) of the present disclosure and an image sensor 890. The photographing lens assembly includes, in order from an object side to an image side, a first lens element 810, a second lens element 820, an aperture stop 800, a third lens element 830, a fourth lens element 840, a fifth lens element 850, a sixth lens element 860, an IR-cut filter 870 and an image surface 880. The photographing lens assembly includes six lens elements (810, 820, 830, 840, 850 and 860) with no additional lens element disposed between the first lens element 810 and the sixth lens element 860.

The first lens element 810 with negative refractive power has an object-side surface 811 being concave in a paraxial region thereof and an image-side surface 812 being concave in a paraxial region thereof. The first lens element 810 is made of plastic material and has the object-side surface 811 and the image-side surface 812 being both aspheric. The object-side surface 811 of the first lens element 810 has at least one convex critical point in an off-axis region thereof.

The second lens element 820 with positive refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric.

The third lens element 830 with positive refractive power has an object-side surface 831 being convex in a paraxial region thereof and an image-side surface 832 being convex in a paraxial region thereof. The third lens element 830 is made of plastic material and has the object-side surface 831 and the image-side surface 832 being both aspheric.

The fourth lens element 840 with positive refractive power has an object-side surface 841 being convex in a paraxial region thereof and an image-side surface 842 being convex in a paraxial region thereof. The fourth lens element 840 is made of plastic material and has the object-side surface 841 and the image-side surface 842 being both aspheric. The object-side surface 841 of the fourth lens element 840 has at least one concave critical point in an off-axis region thereof.

The fifth lens element 850 with negative refractive power has an object-side surface 851 being concave in a paraxial region thereof and an image-side surface 852 being convex in a paraxial region thereof. The fifth lens element 850 is made of plastic material and has the object-side surface 851 and the image-side surface 852 being both aspheric.

The sixth lens element 860 with positive refractive power has an object-side surface 861 being convex in a paraxial region thereof and an image-side surface 862 being concave in a paraxial region thereof. The sixth lens element 860 is made of plastic material and has the object-side surface 861 and the image-side surface 862 being both aspheric. The object-side surface 861 of the sixth lens element 860 has at least one concave critical point in an off-axis region thereof. The image-side surface 862 of the sixth lens element 860 has at least one convex critical point in an off-axis region thereof.

The IR-cut filter 870 is made of glass material and located between the sixth lens element 860 and the image surface 880, and will not affect the focal length of the photographing lens assembly. The image sensor 890 is disposed on or near the image surface 880 of the photographing lens assembly.

The detailed optical data of the 8th embodiment are shown in Table 15 and the aspheric surface data are shown in Table 16 below.

TABLE 15

8th Embodiment
f = 1.88 mm, FNo = 2.05, HFOV = 60.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −5.476 | (ASP) | 0.270 | Plastic | 1.515 | 56.5 | −1.85 |
| 2 | | 1.169 | (ASP) | 0.194 | | | | |
| 3 | Lens 2 | 1.147 | (ASP) | 0.439 | Plastic | 1.594 | 30.6 | 2.97 |
| 4 | | 2.817 | (ASP) | 0.434 | | | | |
| 5 | Ape. Stop | Plano | | −0.023 | | | | |
| 6 | Lens 3 | 4.101 | (ASP) | 0.461 | Plastic | 1.545 | 56.1 | 3.42 |
| 7 | | −3.285 | (ASP) | 0.122 | | | | |
| 8 | Lens 4 | 7.441 | (ASP) | 0.516 | Plastic | 1.545 | 56.1 | 2.66 |
| 9 | | −1.753 | (ASP) | 0.513 | | | | |
| 10 | Lens 5 | −0.416 | (ASP) | 0.270 | Plastic | 1.660 | 20.4 | −1.86 |
| 11 | | −0.791 | (ASP) | 0.030 | | | | |
| 12 | Lens 6 | 0.857 | (ASP) | 0.777 | Plastic | 1.545 | 56.1 | 2.05 |
| 13 | | 2.498 | (ASP) | 0.400 | | | | |
| 14 | IR-cut filter | Plano | | 0.210 | Glass | 1.517 | 64.2 | — |
| 15 | | Plano | | 0.530 | | | | |
| 16 | Image | Plano | | — | | | | |

Note:
Reference wavelength is 587.6 nm (d-line).

TABLE 16

Aspheric Coefficients

| Surface # | 1 | 2 | 3 | 4 | 6 | 7 |
|---|---|---|---|---|---|---|
| k = | −1.0000E+00 | −1.2640E+00 | −8.0159E−03 | 9.0000E+00 | −2.1883E+01 | 1.5378E+01 |
| A4 = | 8.5285E−02 | −1.9304E−01 | −1.8637E−01 | 2.6401E−01 | 1.0061E−01 | −1.8186E−01 |
| A6 = | −3.4356E−02 | 6.0825E−02 | −1.1823E−01 | −6.1124E−02 | 1.5096E−02 | 9.8873E−02 |
| A8 = | 1.0315E−02 | 4.9625E−03 | 2.8365E−01 | 6.5121E−01 | −1.3154E−01 | −9.5487E−02 |
| A10 = | −1.7161E−03 | −3.9752E−03 | −2.2452E−01 | — | — | 2.6658E−01 |
| A12 = | 1.3478E−04 | 1.1003E−03 | — | — | — | — |

| Surface # | 8 | 9 | 10 | 11 | 12 | 13 |
|---|---|---|---|---|---|---|
| k = | −7.3367E+01 | −7.0948E+00 | −3.1074E+00 | −4.3393E+00 | −7.9460E+00 | −1.6994E+00 |
| A4 = | −1.8761E−01 | −2.4552E−01 | −9.5066E−01 | −5.2242E−01 | −4.5292E−03 | −1.0010E−01 |
| A6 = | −9.3138E−02 | −6.2528E−02 | 2.5406E+00 | 1.1418E+00 | −1.1352E−03 | 7.1820E−02 |
| A8 = | 3.7932E−01 | 1.2662E−01 | −4.0713E+00 | −9.5468E−01 | 1.2702E−03 | −3.3321E−02 |
| A10 = | −1.6983E+00 | −2.9908E−01 | 4.1646E+00 | 4.1119E−01 | −3.8439E−03 | 8.5617E−03 |
| A12 = | 3.5907E+00 | 5.0605E−01 | −2.3664E+00 | −8.9487E−02 | 1.5957E−03 | −1.2525E−03 |
| A14 = | −2.1278E+00 | — | 5.1631E−01 | 6.2496E−03 | −2.4469E−04 | 9.5527E−05 |
| A16 = | — | — | — | 4.2209E−04 | 1.3086E−05 | −2.9035E−06 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 1.88 | |R1/R2| | 4.68 |
| FNo | 2.05 | |f1/f6| | 0.90 |
| HFOV [deg.] | 60.0 | |f5/f4| | 0.70 |
| FOV [deg.] | 120.0 | |f/f2| + |f/f6| | 1.55 |
| T12/T23 | 0.47 | |f/f1| | 1.02 |
| (T12 + T56)/(T23 + T34 + T45) | 0.21 | |f/f3| | 0.55 |
| CT6/T56 | 25.90 | |f/f4| | 0.71 |
| TL/R1 | −0.94 | |f/f5| | 1.01 |
| Sag52/CT5 | −1.53 | f/CT6 | 2.42 |
| Y1R1/Y6R2 | 0.78 | (f/R3) + (f/R4) | 2.31 |
| (R5 + R6)/(R5 − R6) | 0.11 | — | — |

9th Embodiment

Figure 17:
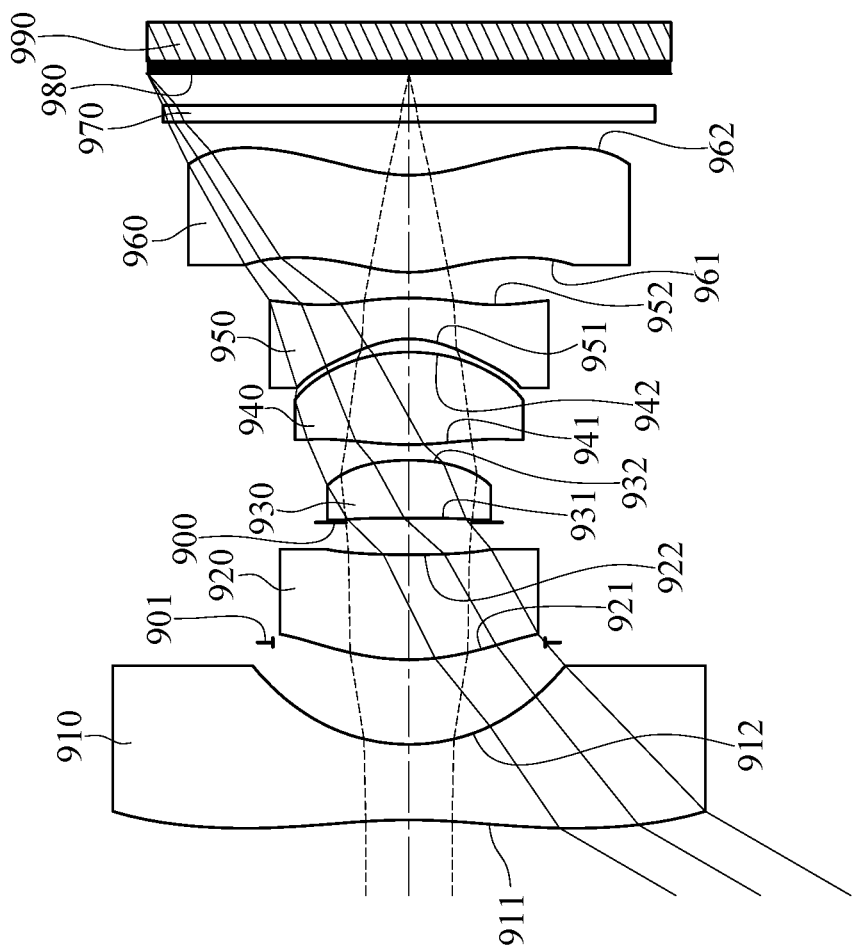
FIG. 17 is a schematic view of an image capturing unit according to the 9th embodiment of the present disclosure.
Figure 18:
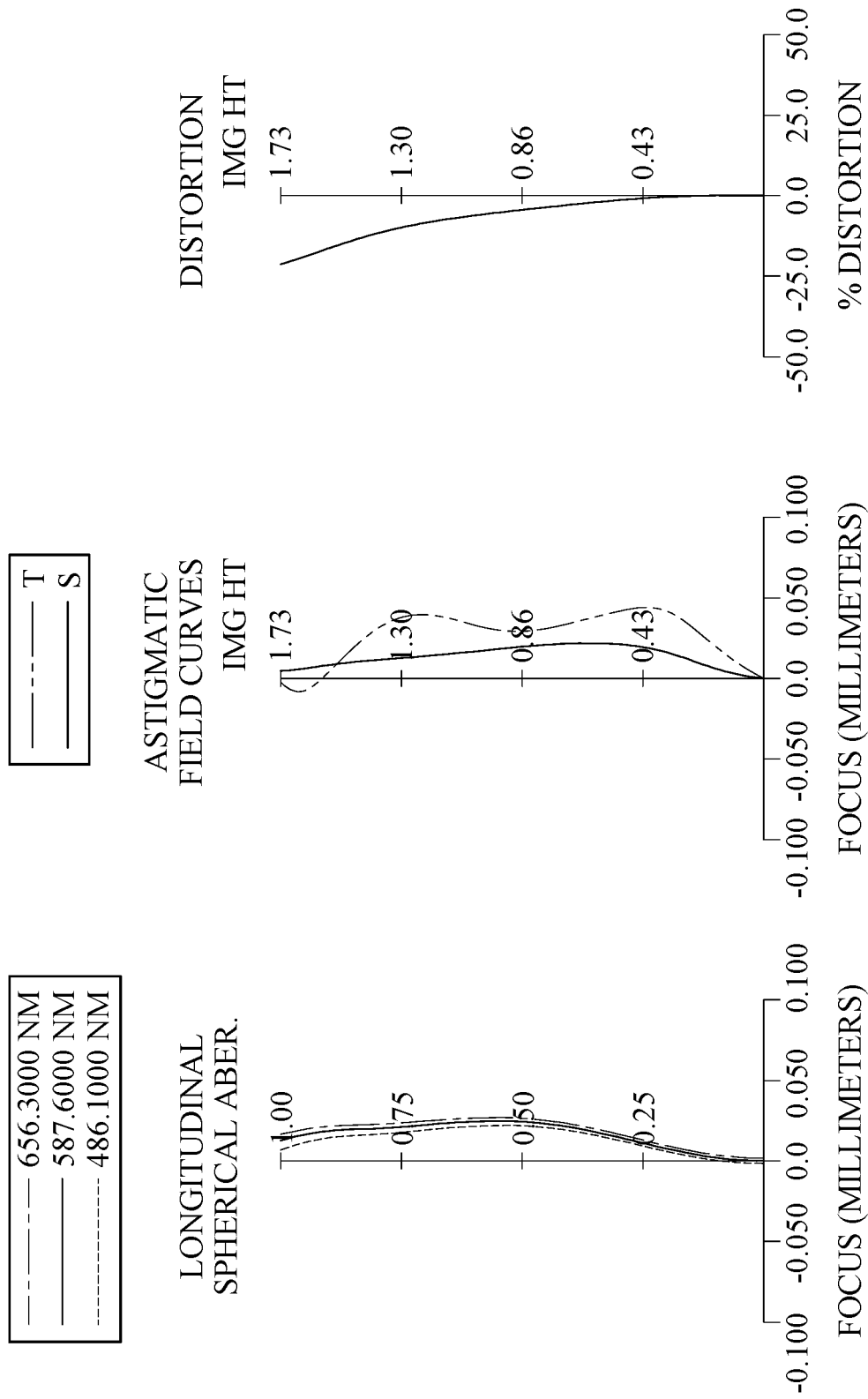
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the photographing lens assembly (its reference numeral is omitted) of the present disclosure and an image sensor 990. The photographing lens assembly includes, in order from an object side to an image side, a first lens element 910, a stop 901, a second lens element 920, an aperture stop 900, a third lens element 930, a fourth lens element 940, a fifth lens element 950, a sixth lens element 960, an IR-cut filter 970 and an image surface 980. The photographing lens assembly includes six lens elements (910, 920, 930, 940, 950 and 960) with no additional lens element disposed between the first lens element 910 and the sixth lens element 960.

The first lens element 910 with negative refractive power has an object-side surface 911 being concave in a paraxial region thereof and an image-side surface 912 being concave in a paraxial region thereof. The first lens element 910 is made of plastic material and has the object-side surface 911 and the image-side surface 912 being both aspheric. The object-side surface 911 of the first lens element 910 has at least one convex critical point in an off-axis region thereof.

The second lens element 920 with positive refractive power has an object-side surface 921 being convex in a paraxial region thereof and an image-side surface 922 being concave in a paraxial region thereof. The second lens element 920 is made of plastic material and has the object-side surface 921 and the image-side surface 922 being both aspheric.

The third lens element 930 with positive refractive power has an object-side surface 931 being concave in a paraxial region thereof and an image-side surface 932 being convex in a paraxial region thereof. The third lens element 930 is made of plastic material and has the object-side surface 931 and the image-side surface 932 being both aspheric.

The fourth lens element 940 with positive refractive power has an object-side surface 941 being convex in a paraxial region thereof and an image-side surface 942 being convex in a paraxial region thereof. The fourth lens element 940 is made of plastic material and has the object-side surface 941 and the image-side surface 942 being both aspheric. The object-side surface 941 of the fourth lens element 940 has at least one concave critical point in an off-axis region thereof.

The fifth lens element 950 with negative refractive power has an object-side surface 951 being concave in a paraxial region thereof and an image-side surface 952 being convex in a paraxial region thereof. The fifth lens element 950 is made of plastic material and has the object-side surface 951 and the image-side surface 952 being both aspheric. The image-side surface 952 of the fifth lens element 950 has at least one concave critical point in an off-axis region thereof.

The sixth lens element 960 with positive refractive power has an object-side surface 961 being convex in a paraxial region thereof and an image-side surface 962 being concave in a paraxial region thereof. The sixth lens element 960 is made of plastic material and has the object-side surface 961 and the image-side surface 962 being both aspheric. The object-side surface 961 of the sixth lens element 960 has at least one concave critical point in an off-axis region thereof. The image-side surface 962 of the sixth lens element 960 has at least one convex critical point in an off-axis region thereof.

The IR-cut filter 970 is made of glass material and located between the sixth lens element 960 and the image surface 980, and will not affect the focal length of the photographing lens assembly. The image sensor 990 is disposed on or near the image surface 980 of the photographing lens assembly.

The detailed optical data of the 9th embodiment are shown in Table 17 and the aspheric surface data are shown in Table 18 below.

TABLE 17

9th Embodiment
f = 1.28 mm, FNo = 2.25, HFOV = 59.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.979 | (ASP) | 0.500 | Plastic | 1.511 | 56.8 | −1.81 |
| 2 | | 1.255 | (ASP) | 0.674 | | | | |
| 3 | Stop | Plano | | −0.114 | | | | |
| 4 | Lens 2 | 1.533 | (ASP) | 0.694 | Plastic | 1.566 | 37.6 | 3.33 |
| 5 | | 6.793 | (ASP) | 0.214 | | | | |
| 6 | Ape. Stop | Plano | | 0.028 | | | | |
| 7 | Lens 3 | −96.454 | (ASP) | 0.383 | Plastic | 1.544 | 55.9 | 2.83 |
| 8 | | −1.517 | (ASP) | 0.103 | | | | |
| 9 | Lens 4 | 1.926 | (ASP) | 0.612 | Plastic | 1.544 | 55.9 | 1.46 |
| 10 | | −1.204 | (ASP) | 0.088 | | | | |

TABLE 17-continued

9th Embodiment
f = 1.28 mm, FNo = 2.25, HFOV = 59.9 deg.

| Surface # | | Curvature Radius | | Thickness | Material | Index | Abbe # | Focal Length |
|---|---|---|---|---|---|---|---|---|
| 11 | Lens 5 | −0.623 | (ASP) | 0.270 | Plastic | 1.650 | 21.5 | −1.37 |
| 12 | | −2.407 | (ASP) | 0.170 | | | | |
| 13 | Lens 6 | 0.879 | (ASP) | 0.643 | Plastic | 1.544 | 55.9 | 4.20 |
| 14 | | 1.060 | (ASP) | 0.350 | | | | |
| 15 | IR-cut filter | Plano | | 0.110 | Glass | 1.517 | 64.2 | — |
| 16 | | Plano | | 0.211 | | | | |
| 17 | Image | Plano | | — | | | | |

Note:
Reference wavelength is 587.6 nm (d-line).
An effective radius of the stop 901 (Surface 3) is 0.900 mm.
An effective radius of the image-side surface 932 (Surface 8) is 0.540 mm.

TABLE 18

Aspheric Coefficients

| Surface # | 1 | 2 | 4 | 5 | 7 | 8 |
|---|---|---|---|---|---|---|
| k = | −2.2161E+00 | −6.3912E+00 | −2.9833E+00 | −6.7319E+00 | −1.0000E+00 | 1.1464E−02 |
| A4 = | 1.0765E−01 | 3.6234E−01 | −5.9090E−02 | 1.0696E−01 | −2.1092E−01 | −8.3003E−01 |
| A6 = | −5.3886E−02 | −2.4889E−01 | 7.6811E−02 | 2.6794E−01 | 1.6334E−01 | 6.9010E−01 |
| A8 = | 1.9212E−02 | 1.7728E−01 | −1.9567E−01 | −4.5708E−01 | −9.4780E+00 | −1.1630E−01 |
| A10 = | −4.2945E−03 | −1.0074E−01 | 7.9619E−02 | 7.8463E−01 | 3.7960E+01 | −5.7777E+00 |
| A12 = | 5.4412E−04 | 4.0369E−02 | — | −6.8620E−01 | −9.6128E+01 | −2.6224E+00 |
| A14 = | −2.9473E−05 | −6.3272E−03 | — | — | — | — |

| Surface # | 9 | 10 | 11 | 12 | 13 | 14 |
|---|---|---|---|---|---|---|
| k = | −1.5363E+00 | −1.1120E+00 | −1.0948E+00 | −4.1770E+00 | −8.2827E+00 | −6.0488E+00 |
| A4 = | −6.7220E−01 | 3.5231E−01 | 1.2395E+00 | −4.3881E−01 | −5.5554E−01 | −2.1922E−01 |
| A6 = | 1.1685E+00 | −6.7029E+00 | −5.9912E+00 | 3.9600E+00 | 1.0570E+00 | 2.5031E−01 |
| A8 = | −2.6917E+00 | 3.2244E+01 | 2.6757E+01 | −9.0220E+00 | −1.6404E+00 | −2.2128E−01 |
| A10 = | 7.7096E+00 | −7.3799E+01 | −6.4076E+01 | 1.0389E+01 | 1.7059E+00 | 1.2043E−01 |
| A12 = | −1.4479E+01 | 8.0058E+01 | 6.9828E+01 | −6.6472E+00 | −1.0822E+00 | −4.0859E−02 |
| A14 = | 9.5475E+00 | −3.4010E+01 | −2.8431E+01 | 2.2493E+00 | 3.7203E−01 | 7.5289E−03 |
| A16 = | — | — | — | −3.1295E−01 | −5.3444E−02 | −5.5371E−04 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 1.28 | |R1/R2| | 3.17 |
| FNo | 2.25 | |f1/f6| | 0.43 |
| HFOV [deg.] | 59.9 | |f5/f4| | 0.94 |
| FOV [deg.] | 119.8 | |f/f2| + |f/f6| | 0.69 |
| T12/T23 | 2.31 | |f/f1| | 0.71 |
| (T12 + T56)/(T23 + T34 + T45) | 1.69 | |f/f3| | 0.45 |
| CT6/T56 | 3.78 | |f/f4| | 0.88 |
| TL/R1 | −1.24 | |f/f5| | 0.93 |
| Sag52/CT5 | −0.06 | f/CT6 | 1.99 |
| Y1R1/Y6R2 | 1.34 | (f/R3) + (f/R4) | 1.02 |
| (R5 + R6)/(R5 − R6) | 1.03 | — | — |

10th Embodiment

Figure 19:
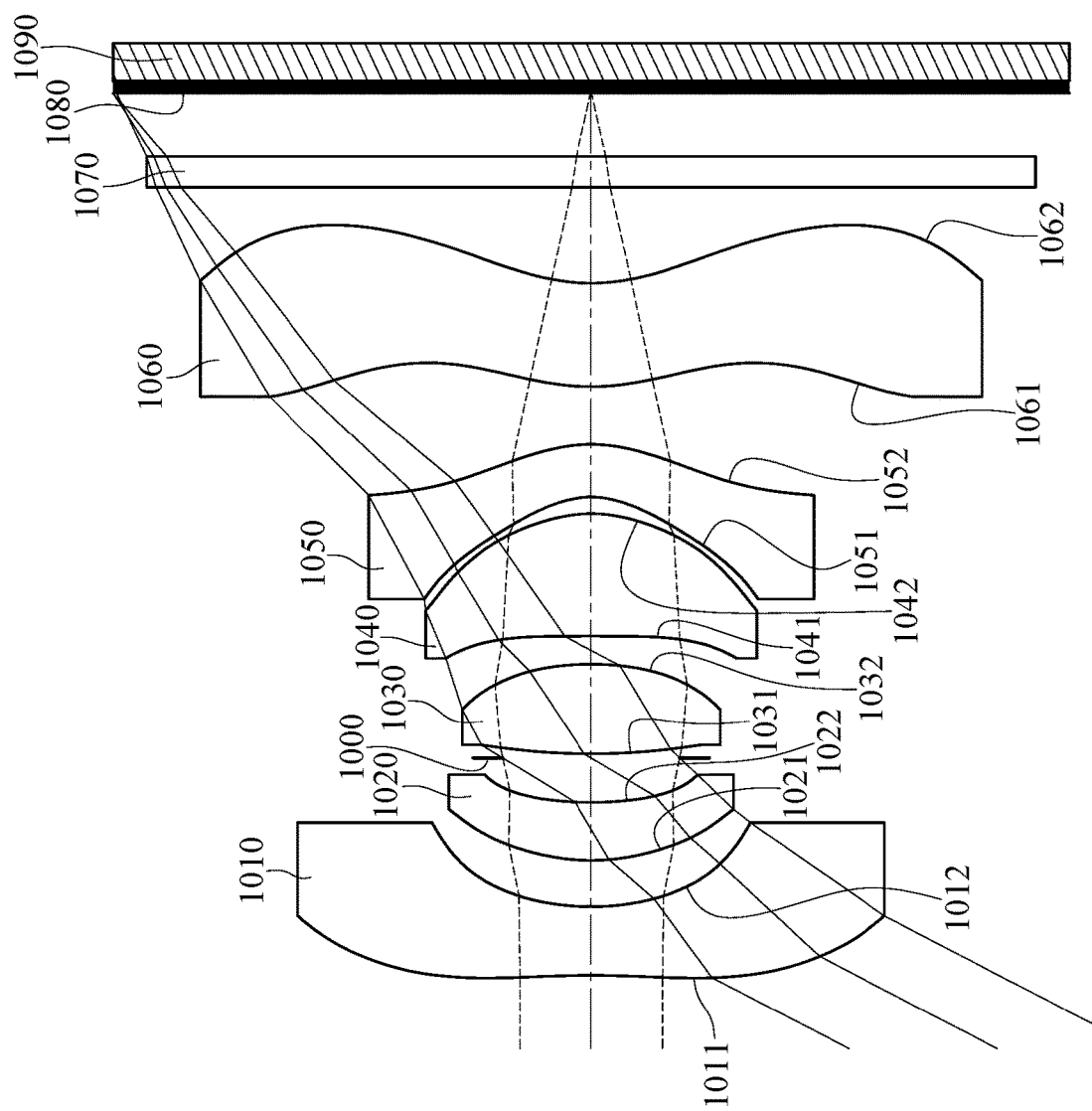
FIG. 19 is a perspective view of an image capturing unit according to the 10th embodiment of the present disclosure.
Figure 20:
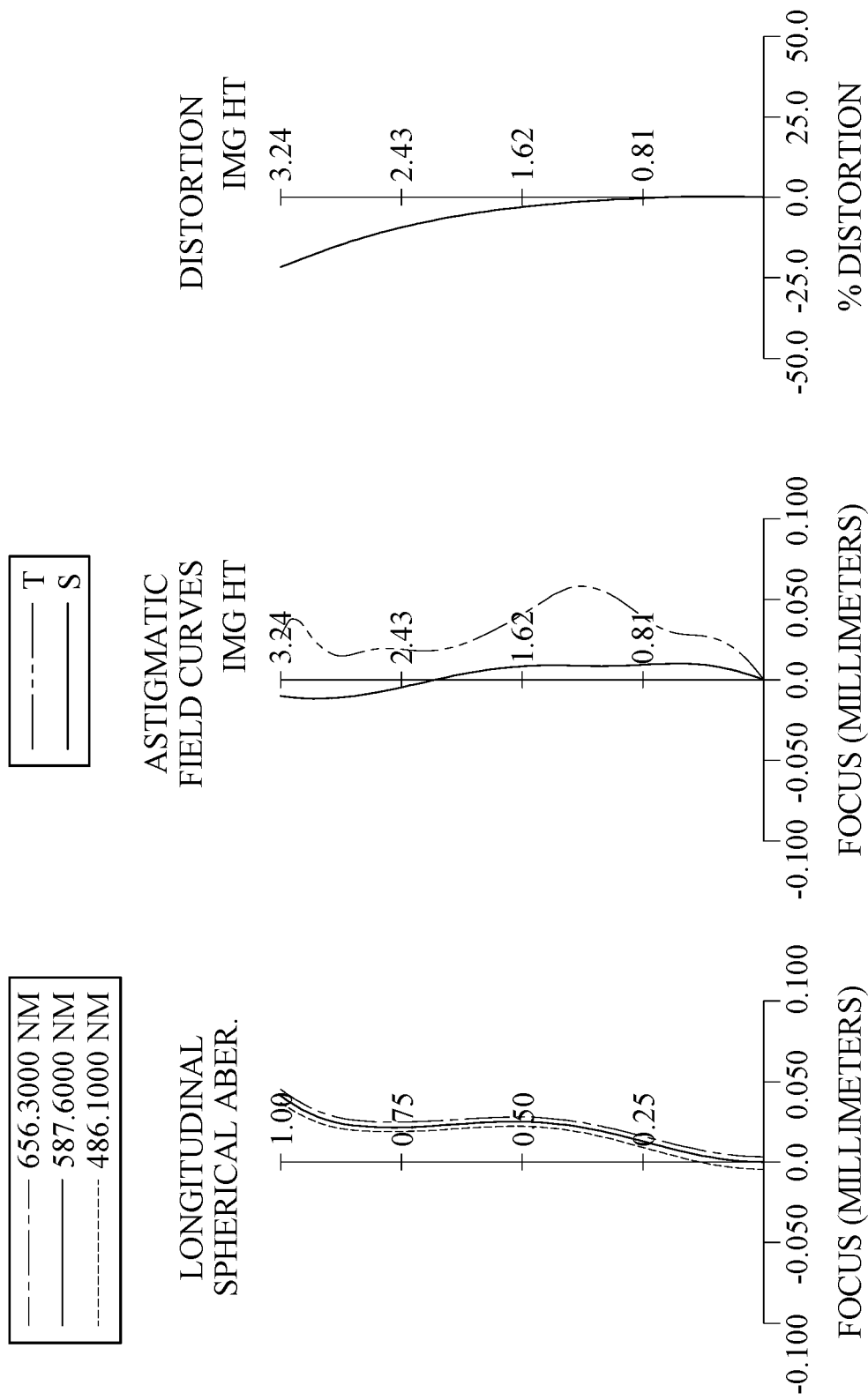
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the photographing lens assembly (its reference numeral is omitted) of the present disclosure and an image sensor 1090. The photographing lens assembly includes, in order from an object side to an image side, a first lens element 1010, a second lens element 1020, an aperture stop 1000, a third lens element 1030, a fourth lens element 1040, a fifth lens element 1050, a sixth lens element 1060, an IR-cut filter 1070 and an image surface 1080. The photographing lens assembly includes six lens elements (1010, 1020, 1030, 1040, 1050 and 1060) with no additional lens element disposed between the first lens element 1010 and the sixth lens element 1060.

The first lens element 1010 with negative refractive power has an object-side surface 1011 being concave in a paraxial region thereof and an image-side surface 1012 being concave in a paraxial region thereof. The first lens element 1010 is made of plastic material and has the object-side surface 1011 and the image-side surface 1012 being both aspheric.

The object-side surface 1011 of the first lens element 1010 has at least one convex critical point in an off-axis region thereof.

The second lens element 1020 with positive refractive power has an object-side surface 1021 being convex in a paraxial region thereof and an image-side surface 1022 being concave in a paraxial region thereof. The second lens element 1020 is made of plastic material and has the object-side surface 1021 and the image-side surface 1022 being both aspheric.

The third lens element 1030 with positive refractive power has an object-side surface 1031 being convex in a paraxial region thereof and an image-side surface 1032 being convex in a paraxial region thereof. The third lens element 1030 is made of plastic material and has the object-side surface 1031 and the image-side surface 1032 being both aspheric.

The fourth lens element 1040 with positive refractive power has an object-side surface 1041 being concave in a paraxial region thereof and an image-side surface 1042 being convex in a paraxial region thereof. The fourth lens element 1040 is made of plastic material and has the object-side surface 1041 and the image-side surface 1042 being both aspheric.

The fifth lens element 1050 with negative refractive power has an object-side surface 1051 being concave in a paraxial region thereof and an image-side surface 1052 being convex in a paraxial region thereof. The fifth lens element 1050 is made of plastic material and has the object-side surface 1051 and the image-side surface 1052 being both aspheric.

The sixth lens element 1060 with negative refractive power has an object-side surface 1061 being convex in a paraxial region thereof and an image-side surface 1062 being concave in a paraxial region thereof. The sixth lens element 1060 is made of plastic material and has the object-side surface 1061 and the image-side surface 1062 being both aspheric. The object-side surface 1061 of the sixth lens element 1060 has at least one concave critical point in an off-axis region thereof. The image-side surface 1062 of the sixth lens element 1060 has at least one convex critical point in an off-axis region thereof.

The IR-cut filter 1070 is made of glass material and located between the sixth lens element 1060 and the image surface 1080, and will not affect the focal length of the photographing lens assembly. The image sensor 1090 is disposed on or near the image surface 1080 of the photographing lens assembly.

The detailed optical data of the 10th embodiment are shown in Table 19 and the aspheric surface data are shown in Table 20 below.

TABLE 19

10th embodiment
f = 2.18 mm, FNo = 2.25, HFOV = 62.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −6.224 | (ASP) | 0.465 | Plastic | 1.545 | 56.0 | −2.46 |
| 2 | | 1.751 | (ASP) | 0.313 | | | | |
| 3 | Lens 2 | 1.453 | (ASP) | 0.392 | Plastic | 1.584 | 28.2 | 5.59 |
| 4 | | 2.354 | (ASP) | 0.302 | | | | |
| 5 | Ape. Stop | Plano | | 0.028 | | | | |
| 6 | Lens 3 | 4.401 | (ASP) | 0.609 | Plastic | 1.545 | 56.0 | 2.65 |
| 7 | | −2.044 | (ASP) | 0.191 | | | | |
| 8 | Lens 4 | −99.204 | (ASP) | 0.828 | Plastic | 1.545 | 56.0 | 1.78 |
| 9 | | −0.964 | (ASP) | 0.115 | | | | |
| 10 | Lens 5 | −0.584 | (ASP) | 0.355 | Plastic | 1.671 | 19.5 | −2.86 |
| 11 | | −1.045 | (ASP) | 0.396 | | | | |
| 12 | Lens 6 | 1.592 | (ASP) | 0.699 | Plastic | 1.544 | 55.9 | −72.01 |
| 13 | | 1.294 | (ASP) | 0.650 | | | | |
| 14 | IR-cut filter | Plano | | 0.210 | Glass | 1.517 | 64.2 | — |
| 15 | | Plano | | 0.430 | | | | |
| 16 | Image | Plano | | — | | | | |

Note:
Reference wavelength is 587.6 nm (d-line).

TABLE 20

Aspheric Coefficients

| Surface # | 1 | 2 | 3 | 4 | 6 | 7 |
|---|---|---|---|---|---|---|
| k = | −1.8075E+01 | 2.0468E−01 | −7.2456E+00 | −8.3313E+00 | −1.1631E+01 | −5.8671E+00 |
| A4 = | 9.8916E−02 | 1.2976E−03 | 1.4808E−01 | 1.6852E−01 | −4.3387E−03 | −2.3213E−01 |
| A6 = | −4.5364E−02 | 1.7217E−01 | −1.1543E−01 | 2.5262E−03 | 1.3754E−01 | −1.0762E−01 |
| A8 = | 1.8670E−02 | −2.1531E−01 | 2.9022E−01 | 1.2279E+00 | −5.9447E−01 | 2.5260E−01 |
| A10 = | −5.0294E−03 | 2.5900E−01 | −1.4018E−01 | −2.8351E+00 | 1.0701E+00 | −2.3611E−01 |
| A12 = | 7.6320E−04 | −9.8438E−02 | −4.2324E−02 | 3.1982E+00 | −7.1005E−01 | 4.9713E−02 |
| A14 = | −4.7555E−05 | — | — | — | — | — |

TABLE 20-continued

| Aspheric Coefficients | | | | | | |
|---|---|---|---|---|---|---|
| Surface # | 8 | 9 | 10 | 11 | 12 | 13 |
| k = | −1.2244E+01 | −1.4337E+00 | −3.1230E+00 | −6.0974E+00 | −1.1620E+00 | −1.1600E+00 |
| A4 = | −1.2900E−01 | 3.2902E−01 | −6.0579E−02 | −8.4092E−02 | −1.9664E−01 | −1.6205E−01 |
| A6 = | −6.0444E−02 | −9.3533E−01 | −3.0656E−02 | 8.9882E−02 | 4.7851E−02 | 5.2465E−02 |
| A8 = | 2.0976E−03 | 1.1767E+00 | 2.2539E−01 | 1.3855E−01 | −4.4689E−03 | −1.2300E−02 |
| A10 = | 8.9558E−02 | −9.4755E−01 | −3.0232E−01 | −2.3448E−01 | −4.2152E−04 | 1.8613E−03 |
| A12 = | −5.8447E−02 | 3.9572E−01 | 1.0310E−01 | 1.3609E−01 | 1.5307E−04 | −1.6484E−04 |
| A14 = | — | −5.3320E−02 | — | −3.6264E−02 | −1.1309E−05 | 6.3714E−06 |
| A16 = | — | — | — | 3.7264E−03 | — | — |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 2.18 | |R1/R2| | 3.55 |
| FNo | 2.25 | |f1/f6| | 0.03 |
| HFOV [deg.] | 62.5 | |f5/f4| | 1.61 |
| FOV [deg.] | 125.0 | |f/f2| + |f/f6| | 0.42 |
| T12/T23 | 0.95 | |f/f1| | 0.89 |
| (T12 + T56)/(T23 + T34 + T45) | 1.11 | |f/f3| | 0.82 |
| CT6/T56 | 1.77 | |f/f4| | 1.22 |
| TL/R1 | −0.96 | |f/f5| | 0.76 |
| Sag52/CT5 | −0.97 | f/CT6 | 3.12 |
| Y1R1/Y6R2 | 0.75 | (f/R3) + (f/R4) | 2.43 |
| (R5 + R6)/(R5 − R6) | 0.37 | — | — |

11th Embodiment

Figure 21:
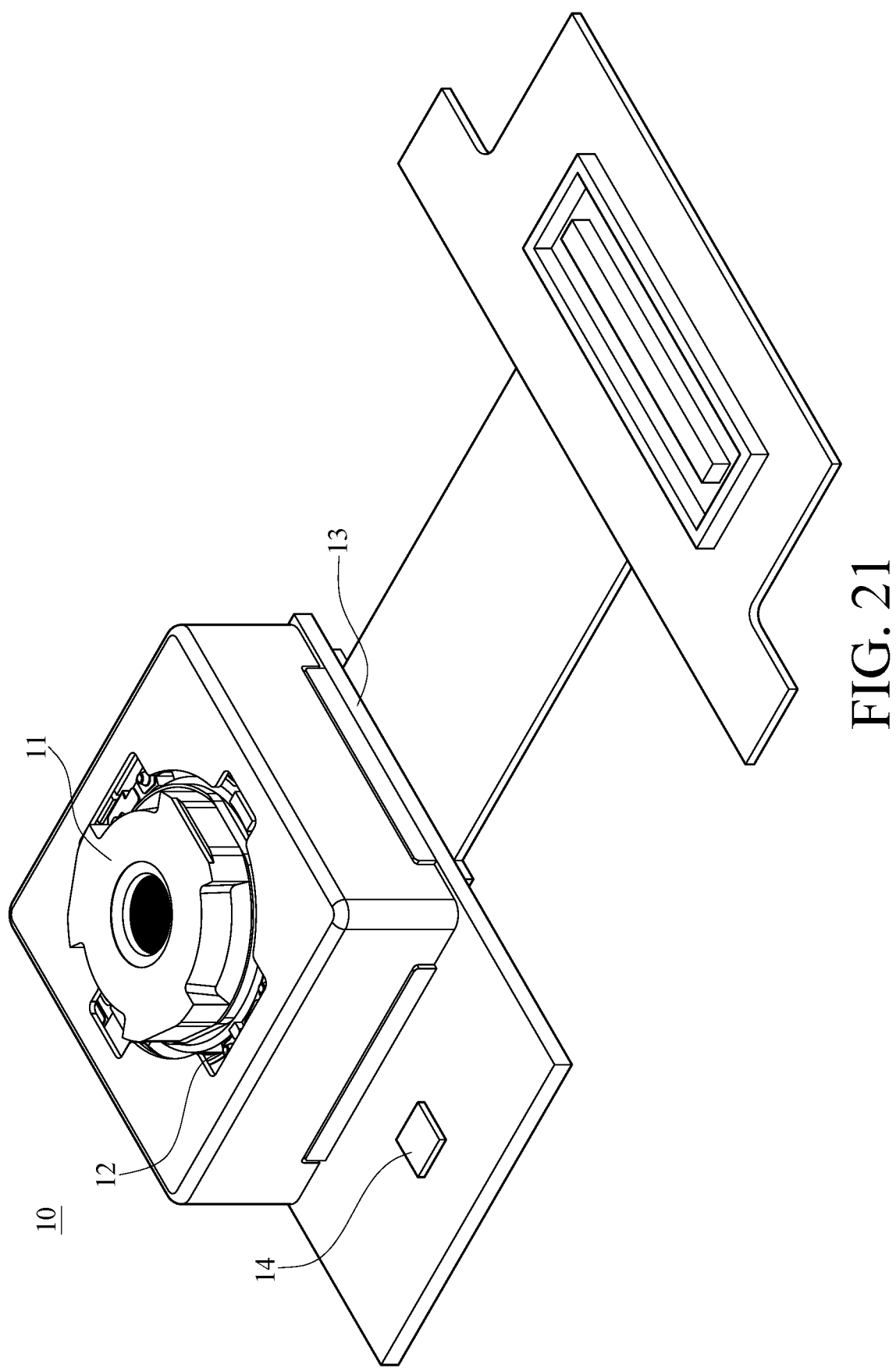
FIG. 21 is a perspective view of an image capturing unit according to the 11th embodiment of the present disclosure.

FIG. 21 is a perspective view of an image capturing unit according to the 11th embodiment of the present disclosure. In this embodiment, an image capturing unit 10 is a camera module including a lens unit 11, a driving device 12, an image sensor 13 and an image stabilizer 14. The lens unit 11 includes the photographing lens assembly disclosed in the 1st embodiment, a barrel and a holder member (their reference numerals are omitted) for holding the photographing lens assembly. The imaging light converges into the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature with high photosensitivity and low noise, is disposed on the image surface of the photographing lens assembly to provide higher image quality.

The image stabilizer 14, such as an accelerometer, a gyroscope and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving the image quality while in motion or low-light conditions.

12th Embodiment

Figure 22:
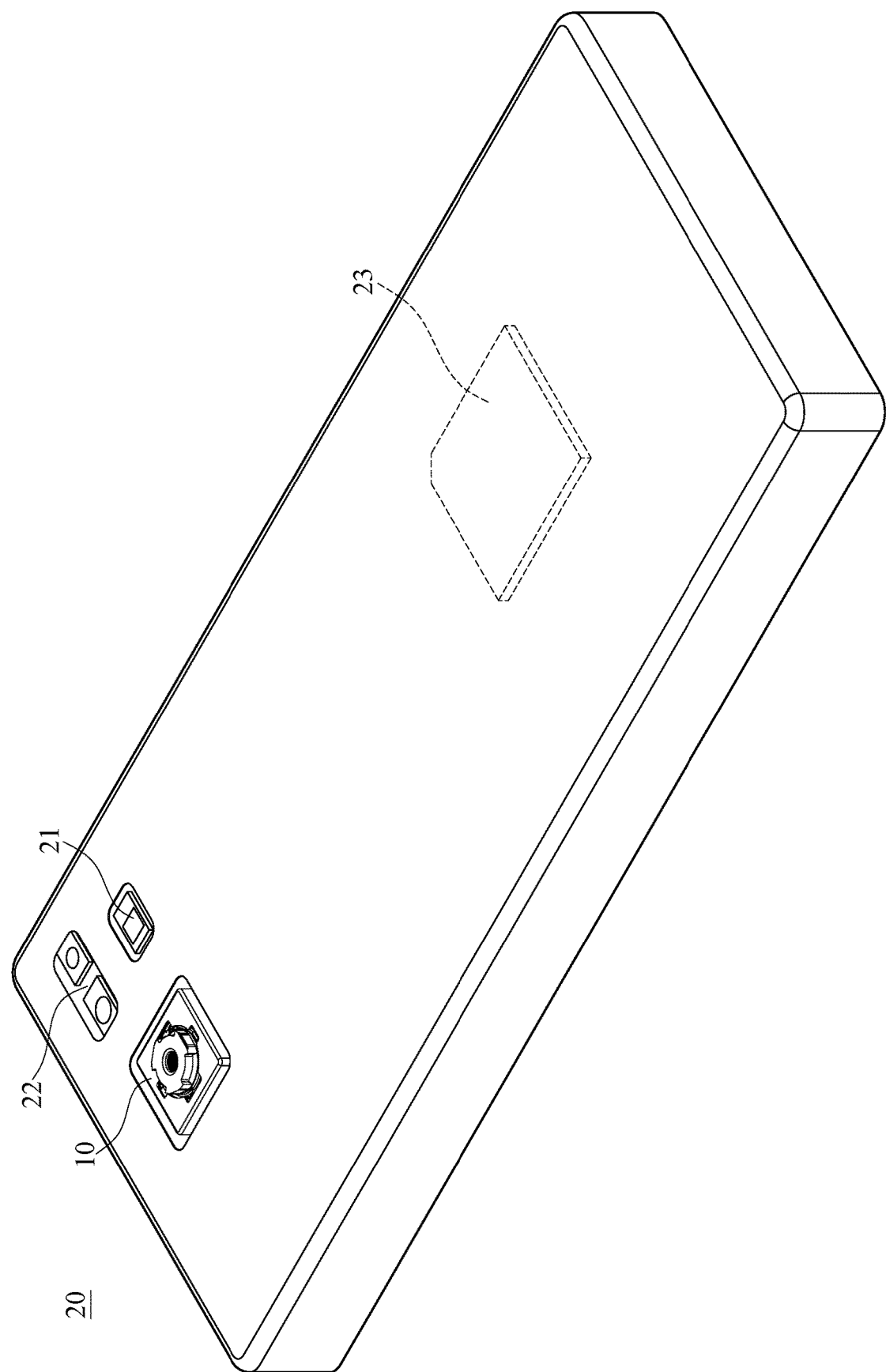
FIG. 22 is one perspective view of an electronic device according to the 12th embodiment of the present disclosure.
Figure 23:
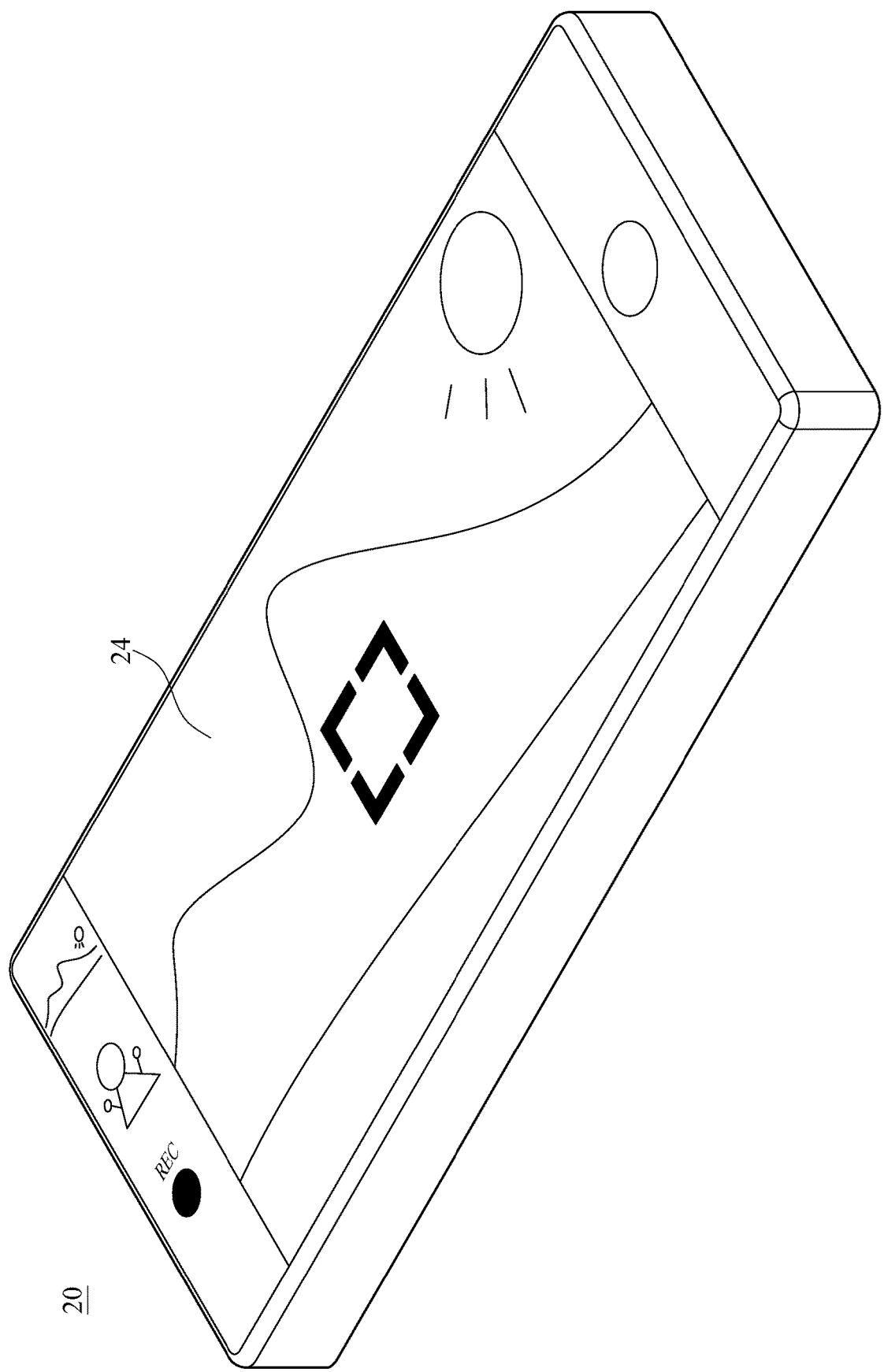
FIG. 23 is another perspective view of the electronic device in FIG. 22.
Figure 24:
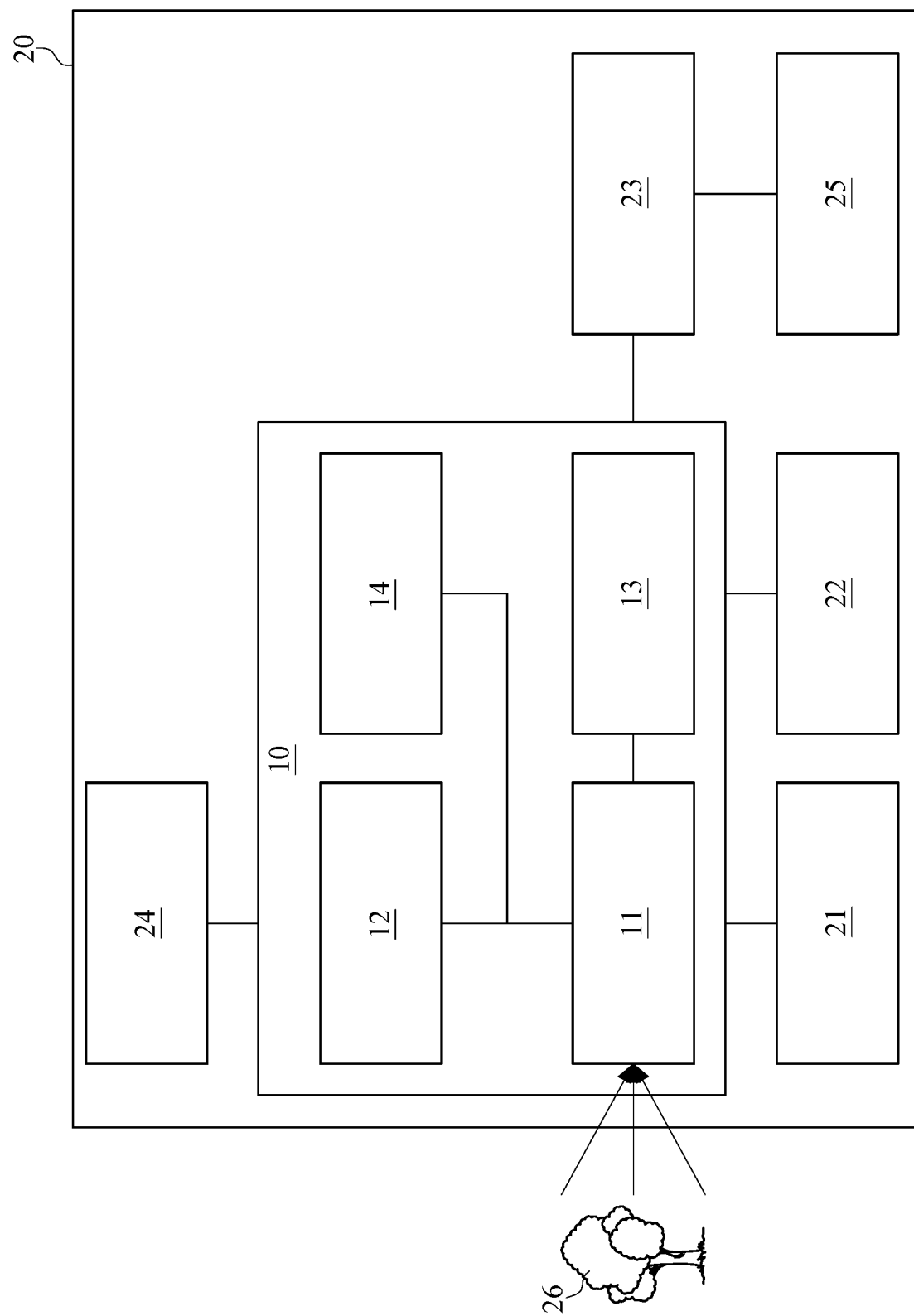
FIG. 24 is a block diagram of the electronic device in FIG. 22.

FIG. 22 is one perspective view of an electronic device according to the 12th embodiment of the present disclosure. FIG. 23 is another perspective view of the electronic device in FIG. 22. FIG. 24 is a block diagram of the electronic device in FIG. 22. In this embodiment, an electronic device 20 is a smartphone including the image capturing unit 10 disclosed in the 11th embodiment, a flash module 21, a focus assist module 22, an image signal processor 23, an user interface 24 and an image software processor 25. In this embodiment, the electronic device 20 includes one image capturing unit 10, but the disclosure is not limited thereto. In some cases, the electronic device 20 can include multiple image capturing units 10, or the electronic device 20 further includes another different image capturing unit.

When a user captures the images of an object 26 through the user interface 24, the light rays converge in the image capturing unit 10 to generate an image, and the flash module 21 is activated for light supplement. The focus assist module 22 detects the object distance of the imaged object 26 to achieve fast auto focusing. The image signal processor 23 is configured to optimize the captured image to improve the image quality. The light beam emitted from the focus assist module 22 can be either conventional infrared or laser. The user interface 24 can be a touch screen or a physical button. The user is able to interact with the user interface 24 and the image software processor 25 having multiple functions to capture images and complete image processing.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the photographing lens assembly of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, motion sensing input devices, wearable devices and other electronic imaging devices.

The foregoing description, for the purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing lens assembly comprising six lens elements, the six lens elements being, in order from an object side to an image side:

a first lens element with negative refractive power having an object-side surface being concave in a paraxial region thereof, wherein the object-side surface of the first lens element has at least one convex critical point in an off-axis region thereof;

a second lens element;

a third lens element having an image-side surface being convex in a paraxial region thereof;

a fourth lens element having positive refractive power;

a fifth lens element with negative refractive power having an object-side surface being concave in a paraxial region thereof and an image-side surface being convex in a paraxial region thereof; and a sixth lens element having an image-side surface being concave in a paraxial region thereof, wherein the image-side surface of the sixth lens element has at least one convex critical point in an off-axis region thereof, and an object-side surface and the image-side surface of the sixth lens element are both aspheric;

wherein a curvature radius of the object-side surface of the first lens element is R1, a curvature radius of an image-side surface of the first lens element is R2, a central thickness of the sixth lens element is CT6, an axial distance between the fifth lens element and the sixth lens element is T56, an axial distance between the first lens element and the second lens element is T12, an axial distance between the second lens element and the third lens element is T23, and the following conditions are satisfied:

|R1/R2|<5.0;

1.60<CT6/T56<100; and 0.68<T12/T23<1.60.

2. The photographing lens assembly of claim 1, wherein a maximum field of view of the photographing lens assembly is FOV, an f-number of the photographing lens assembly is FNo, and the following conditions are satisfied:

100 [deg.]<FOV<200 [deg.]; and 1.25<FNo<3.0.

3. The photographing lens assembly of claim 1, wherein a focal length of the fourth lens element is f4, a focal length of the fifth lens element is f5, and the following condition is satisfied:

|f5/f4|<1.50.

4. The photographing lens assembly of claim 1, wherein the second lens element has an object-side surface being convex in a paraxial region thereof and an image-side surface being concave in a paraxial region thereof.

5. The photographing lens assembly of claim 1, wherein the central thickness of the sixth lens element is CT6, the axial distance between the fifth lens element and the sixth lens element is T56, and the following condition is satisfied:

2.0<CT6/T56<100.

6. The photographing lens assembly of claim 1, wherein a focal length of the first lens element is f1, a focal length of the sixth lens element is f6, and the following condition is satisfied:

|f1/f6|<1.0.

7. The photographing lens assembly of claim 1, wherein a maximum effective radius of the object-side surface of the first lens element is Y1R1, a maximum effective radius of the image-side surface of the sixth lens element is Y6R2, and the following condition is satisfied:

0.60<Y1R1/Y6R2<1.0.

8. The photographing lens assembly of claim 1, wherein each of at least two lens elements among the second through the fifth lens elements has at least one critical point in an off-axis region thereof.

9. The photographing lens assembly of claim 1, wherein a curvature radius of an object-side surface of the third lens element is R5, a curvature radius of the image-side surface of the third lens element is R6, and the following condition is satisfied:

0.25<(R5+R6)/(R5−R6)<1.50.

10. The photographing lens assembly of claim 1, wherein the sixth lens element has positive refractive power, and the object-side surface of the sixth lens element is convex in a paraxial region thereof.

11. The photographing lens assembly of claim 1, wherein a focal length of the photographing lens assembly is f, a curvature radius of an object-side surface of the second lens element is R3, a curvature radius of an image-side surface of the second lens element is R4, and the following condition is satisfied:

1.5<(f/R3)+(f/R4)<5.0.

12. The photographing lens assembly of claim 1, wherein the axial distance between the first lens element and the second lens element is T12, the axial distance between the second lens element and the third lens element is T23, an axial distance between the third lens element and the fourth lens element is T34, an axial distance between the fourth lens element and the fifth lens element is T45, the axial distance between the fifth lens element and the sixth lens element is T56, and the following condition is satisfied:

0.35<(T12+T56)/(T23+T34+T45)<1.75.

13. The photographing lens assembly of claim 1, wherein a focal length of the photographing lens assembly is f, the central thickness of the sixth lens element is CT6, and the following condition is satisfied:

f/CT6<3.60.

14. The photographing lens assembly of claim 1, wherein a displacement in parallel with an optical axis from an axial vertex of the image-side surface of the fifth lens element to a maximum effective radius position of the image-side surface of the fifth lens element is Sag52, a central thickness of the fifth lens element is CT5, and the following condition is satisfied:

$$-0.75 < Sag52/CT5 < 0.25.$$

15. The photographing lens assembly of claim 1, further comprising an aperture stop disposed between the second lens element and the third lens element.

16. The photographing lens assembly of claim 1, wherein an axial distance between the object-side surface of the first lens element and an image surface is TL, the curvature radius of the object-side surface of the first lens element is R1, and the following condition is satisfied:

$$-5.0 < TL/R1 < -0.50.$$

17. The photographing lens assembly of claim 1, wherein a focal length of the photographing lens assembly is f, a focal length of the second lens element is f2, a focal length of the sixth lens element is f6, a focal length of the i-th lens element is fi, and the following condition is satisfied:

$$|f/f2| + |f/f6| < |f/fi|,$$

wherein i=1, 3, 4, 5.

18. The photographing lens assembly of claim 1, wherein the second lens element has positive refractive power.

19. An image capturing unit, comprising:
   the photographing lens assembly of claim 1; and
   an image sensor disposed on an image surface of the photographing lens assembly.

20. An electronic device, comprising:
   the image capturing unit of claim 19.

* * * * *